United States Patent
Decoux et al.

(10) Patent No.: US 12,355,894 B2
(45) Date of Patent: Jul. 8, 2025

(54) DIGITAL FILE ANTI-FORGERY PROTECTION

(71) Applicant: SICPA HOLDING SA, Prilly (CH)

(72) Inventors: Eric Decoux, Vevey (CH); Philippe Gillet, Pully (CH); Philippe Thevoz, Penthalaz (CH); Elisabeth Wallace, Pully (CH)

(73) Assignee: SICPA HOLDING SA, Prilly (CH)

( * ) Notice: Subject to any disclaimer, the term of this patent is extended or adjusted under 35 U.S.C. 154(b) by 847 days.

(21) Appl. No.: 17/266,442

(22) PCT Filed: Jul. 15, 2019

(86) PCT No.: PCT/EP2019/068986
§ 371 (c)(1),
(2) Date: Feb. 5, 2021

(87) PCT Pub. No.: WO2020/030382
PCT Pub. Date: Feb. 13, 2020

(65) Prior Publication Data
US 2021/0258168 A1    Aug. 19, 2021

(30) Foreign Application Priority Data

Aug. 6, 2018 (EP) ..................................... 18187473

(51) Int. Cl.
*H04L 9/32* (2006.01)
*G06F 16/14* (2019.01)
*H04L 9/00* (2022.01)

(52) U.S. Cl.
CPC .......... *H04L 9/3247* (2013.01); *G06F 16/152* (2019.01); *H04L 9/3239* (2013.01); *H04L 9/50* (2022.05)

(58) Field of Classification Search
None
See application file for complete search history.

(56) References Cited

U.S. PATENT DOCUMENTS 5,781,629 A       7/1998   Haber et al.
2009/0083372 A1*  3/2009   Teppler ................. H04L 9/3297
                                                           380/277

(Continued)

FOREIGN PATENT DOCUMENTS

EP    1039420 A2    9/2000
EP    1770656 A2    4/2007
EP    3031169 B1    10/2018

OTHER PUBLICATIONS

Bruschi, F., Rana, V., Pagani, A. and Sciuto, D., 2020. Tunneling trust into the blockchain: a merkle based proof system for structured documents. IEEE Access, 9, pp. 103758-103771. (Year: 2020).*

(Continued)

*Primary Examiner* — Luu T Pham
*Assistant Examiner* — Edward X Long
(74) *Attorney, Agent, or Firm* — MUNCY, GEISSLER, OLDS & LOWE, P.C.

(57) ABSTRACT

The invention relates to securing of an original digital file against forgery and falsifying of its associated data, and particularly of data relating to its belonging to a specific batch of original digital files, while allowing offline or online checking of the authenticity of a secured digital file and conformity of its associated data with respect to that of a genuine original digital file. The invention is particularly useful for securing print-ready digital files.

16 Claims, 4 Drawing Sheets

(56) References Cited

U.S. PATENT DOCUMENTS

| | | | |
|---|---|---|---|
| 2009/0180698 A1 | 7/2009 | Ramani et al. | |
| 2015/0052615 A1 | 2/2015 | Gault et al. | |
| 2016/0351080 A1* | 12/2016 | Bhatnagar | G09C 5/00 |
| 2017/0272250 A1* | 9/2017 | Kaliski, Jr. | H04L 9/3239 |
| 2018/0219683 A1 | 8/2018 | Deery et al. | |
| 2019/0123910 A1* | 4/2019 | Riley | H04L 9/3247 |
| 2019/0312863 A1* | 10/2019 | Chow | H04L 9/0643 |

OTHER PUBLICATIONS

Jayaprakash, J.S., Balasubramanian, K., Sulaiman, R., Parameshachari, B.D. and Iwendi, C., 2022. Cloud data encryption and authentication based on enhanced Merkle hash tree method. Computers, Materials & Continua, 72(1). (Year: 2022).*

R. L. Rivest in "The MD5 Message-Digest Algorithm", Request for Comments (RFC) 1321, Internet Activities Board, Apr. 1992, 19 pages.

Office Action issued in counterpart Eurasian Patent Application No. 202190438 dated May 31, 2022 (and English language translation of the Office Action).

S. Goldwasser and M. Bellare "Lecture Notes on Cryptography", MIT, Jul. 2008 (289 pages).

International Search Report and Written Opinion of the International Searching Authority with respect to Application No. PCT/EP2019/068986.

International Preliminary Report on Patentability and Written Opinion of the International Preliminary Examining Authority with respect to Application No. PCT/EP2019/068986.

Notification of Japanese Office Action in counterpart Japan Patent Application No. 2021-505698 dated Jun. 6, 2023 (and English language translation of Office Action).

* cited by examiner

US 12,355,894 B2

DIGITAL FILE ANTI-FORGERY PROTECTION

TECHNICAL FIELD

The present invention relates to the technical field of protection of digital data against forgery or tampering, and traceability of digital files.

BACKGROUND ART

The problems of counterfeiting and tampering digital files are well known, serious, and growing. The example of falsifying data marked on an original digital document such as a digital identity document or a digital version of a diploma is well known, and the concern is even worse if considering a digital copy of the original (possibly genuine) digital document. Simply keeping track of identifiers such as serial numbers, or even including some digital watermarks, is in general a weak response, because counterfeiters can easily copy such numbers or digital watermarks as well.

One other drawback of most conventional methods for insuring the authenticity of digital files, or securing their digital data, is that they tend to view files in isolation, even if they are members of a well-defined group such as a batch of digital documents for example. This ignores valuable authenticating information.

It is therefore an object of the invention to secure a printable digital file against forgery and falsifying of its associated data, and particularly of data relating to its belonging to a specific batch of digital files. It is also an object of the invention to allow offline checking of the authenticity of a printable digital file secured according to the invention and conformity of its digital data content with respect to that of a genuine digital file. The invention is also aimed at securing printable digital files so that it is easy to check authenticity of the data content of both the printable digital files and their printed versions. Particularly, a goal of the invention is to secure print-ready digital files, a print ready digital file being known as a print file that meets the following criteria: all (possible) RGB images are converted into CMYK color, the file is in proper format like PSD, EPS, AI, High-Resolution JPG, PDF or TIF, and final image has enough resolution (i.e. 300 dpi or higher).

SUMMARY OF THE INVENTION

According to one aspect the invention relates to a method of securing a given original digital file belonging to a batch of a plurality of original digital files against forgery or tampering, each original digital file including its own digital data, characterized by comprising the steps of:

for each original digital file of the batch, calculating by means of a one-way function an associated digital file signature of its digital data;

forming a tree based on the plurality of calculated digital file signatures for the original digital files of the batch and comprising nodes arranged according to a given nodes ordering in the tree, said tree comprising node levels from the leaf nodes, corresponding to the plurality of digital file signatures respectively associated to the plurality of original digital files in the batch, to the root node of the tree, every non-leaf node of the tree corresponding to a digital signature by means of the one-way function of a concatenation of the respective digital signatures of its child nodes according to a tree concatenation ordering, the root node corresponding to a reference root digital signature, i.e. a digital signature by means of the one-way function of a concatenation of the digital signatures of the nodes of a penultimate nodes level in the tree according to said tree concatenation ordering;

associating with the given original digital file a corresponding digital verification key being a sequence of the respective digital signatures, from the leaf nodes level to the penultimate nodes level, of every other leaf node having the same parent node in the tree that the leaf-node corresponding to the digital file signature of the given original digital file, and successively at each next level in the tree, of every non-leaf node having the same parent node in the tree that the previous same parent node considered at the preceding level;

making available to a user the reference root digital signature of the tree; and including in the given original digital file a corresponding digital security marking comprising a machine readable representation of its digital data and its corresponding digital verification key, thereby obtaining a marked original digital file of which digital data are secured against forgery or tampering.

Thus, if the digital security marking included in the digital file is printable as a barcode, the printed document (including the printed barcode) obtained by printing the secured digital file (by means of a conventional printer) is also secured, i.e. its printed data are secured against forgery or tampering.

The reference root digital signature of the root node of the tree may either be published in a media accessible to the user, or stored in a searchable root database accessible to the user, or stored in a blockchain, or in a database secured by a blockchain, accessible to the user. Thus, the reference root digital signature is made immutable.

Thus, according to the invention, the entanglement of the digital signatures of all the original digital files of a batch, due to the tree structure and use of robust one-way functions for calculating the node values of the tree, together with the root digital signature of the tree that is made immutable and the inclusion of the digital data and its associated digital verification key in a digital security marking included in the corresponding original digital file, allow tracking and tracing the marked files and their copies, as well as their printed versions, with a very high level of reliability while preventing falsification of data and forgery of the marked files.

The marked original digital file may further comprise root node access data included thereto and containing information sufficient to allow the user to access to the reference root digital signature of the root node of the tree corresponding to the batch of original digital files, said information being a link to an access interface operable to receive from the user a root request containing digital data, or digital file signature, obtained from a digital security marking of a marked original digital file, and send back a reference root digital signature of corresponding tree, the access interface allowing access to, respectively, one of the following:

the media wherein the reference root digital signature is published;

the searchable root database wherein the reference root digital signature is stored; and the blockchain, or respectively the database secured by a blockchain, wherein the time-stamped reference root digital signature is stored.

According to the invention, it is also possible that:

a virtual digital file is counted as belonging to the batch of original digital files, said virtual digital file including its own virtual digital data, and an associated virtual digital file signature obtained by means of the one-way function of the virtual digital data, said virtual digital file being not real but only used for generating the associated virtual digital file signature from its virtual digital data; and the reference root digital signature associated with said batch of original digital files being calculated from a tree having all the digital files signatures of the original digital files of the batch, including the virtual digital file signature, as leaf nodes.

In order to have shorter signatures the one-way function may be a hash function and an a digital signature of an original digital file may be a sequence of a given plurality of bits of lower weights selected from the bits of a hash value of the corresponding digital data.

In the above method, additional digital data corresponding to the digital data associated with the marked original digital file may be stored in a searchable information database accessible to the user via an information database interface operable to receive from the user an information request containing digital data, or a digital file signature, obtained from a digital security marking of a marked original digital file, and send back corresponding additional digital data.

The digital data of the marked original digital file may further include reference characteristic digital data of a corresponding unique physical characteristic of an associated object or individual. Moreover, the unique physical characteristic of the associated object or individual may be, respectively, that of a material-based security marking applied on the associated object or identifying biometric feature of the associated individual.

In the above method, the sequence of digital signatures in the digital verification key included in the digital security marking may be arranged according to a sequence ordering of the nodes which is distinct from the ordering of corresponding nodes defined by the tree concatenation ordering, and the digital security marking may further include an ordering code associated with said sequence ordering. These features increase the level of security with respect to code breaking attacks.

According to the invention, in case the digital data of the respective original digital files of the batch are spread between given fields common to all the digital files of the batch, specific digital data relating to these fields may not be included in the digital data but may be clustered in a separate fields data block associated with the batch, wherein:

i) the digital file signature of an original digital file is calculated with the one-way function of a concatenation of the corresponding digital data and the fields data block; and ii) the reference root digital signature is made available to the user together with the associated fields data block.

Another aspect of the invention relates to a method of verifying the authenticity of a digital file secured according to the above securing method, or the conformity of a copy of such secured digital file with respect to the original one, comprising the steps of, upon processing a test file being said digital file or said copy of the digital file by means of a processing unit connected to a memory:

having stored in the memory the test file;

reading a representation of digital data and of a digital verification key on a digital security marking of the stored test file, and extracting respectively corresponding test digital data and test digital verification key from said read representation;

having stored in the memory a reference root digital signature of a root node of a tree of the batch of original digital files, and having programmed in the processing unit the one-way function to calculate a digital signature of digital data and of a concatenation of digital signatures according to the nodes ordering in the tree and the tree concatenation ordering;

verifying whether the extracted test digital data and associated test digital verification key indeed correspond to the stored reference root digital signature by performing the steps of:

calculating with the one-way function a test digital signature of the extracted test digital data, said test digital signature corresponding to a test leaf node in a test tree corresponding to the digital security marking of the test file;

extracting from the sequence of digital signatures in the test digital verification key, a digital signature of every other leaf node of the test tree having the same parent node than that of the test leaf node and calculating a digital signature of a concatenation of the test digital signature and the extracted digital signature of said every other leaf node, thus obtaining a digital signature of said same parent node of the test leaf node;

successively at each next level in the test tree and up to the penultimate nodes level, extracting from the sequence of digital signatures in the test digital verification key, a digital signature of every other non-leaf node of the test tree having the same parent node than that of the previous same parent node considered at the preceding step and calculating a digital signature of a concatenation of the digital signature of said respective every other non-leaf node and the obtained digital signature of said previous same parent node, thus obtaining a digital signature of said same parent node of said previous same parent node;

calculating a digital signature of a concatenation of the obtained digital signatures of the non-leaf nodes corresponding to the penultimate nodes level of the test tree, thus obtaining a candidate root digital signature of the root node of the test tree; and checking whether the obtained candidate root digital signature matches the stored reference root digital signature, whereby, in case said root digital signatures match, the digital data of the test file are that of a genuine digital file.

If the marked original digital file is secured while having the above mentioned separate fields data block, the memory of the processing unit may further store the associated fields data block, and the step of calculating a test digital signature corresponding to a test leaf node in a test tree corresponding to the digital security marking on the test file may comprise calculating with the one-way function a digital signature of a concatenation of the extracted test digital data and the stored fields data block.

If the digital file is has been secured by storing the reference root digital signature in a searchable root database accessible to the user as mentioned above, and the processing unit is further connected to a communication unit operable to send and receive back data via a communication link, the above verifying method may comprise the preliminary steps of:

sending with the communication unit via the communication link a request to said root database, and receiving back the reference root digital signature; and storing the received root digital signature in the memory of the memory.

If the secured digital file comprises root node access data as explained above, and the processing unit is further connected to a communication unit operable to send and receive data via a communication link, the above verifying method may comprise the preliminary steps of:

reading the root node access data included in the test file;

sending with the communication unit via the communication link a root request to said access interface containing digital data, or a digital signature of said digital data, obtained from the digital security marking on the test file, and receiving back a corresponding reference root digital signature of associated batch; and storing the received reference root digital signature in the memory.

If the marked digital file has associated additional digital data stored in a searchable information database as mentioned above, the imager may further be equipped with communication means operable to send to the information database interface an information request containing digital data, or a digital file signature, obtained from the digital security marking of the test file, and receive back corresponding additional digital data.

In case the secured digital file includes reference characteristic digital data as mentioned above, and the imager is further equipped with a sensor operable to detect a unique physical characteristic of respectively an associated object or individual, and the processing unit is programmed to extract corresponding characteristic digital data from a detection signal received from the sensor, the imager having stored in the memory reference characteristic digital data CDD corresponding to said unique physical characteristic of respectively the associated object or individual, the verifying method may comprise the further steps of, upon viewing a subject being said associated object or individual:

detecting with the sensor a unique physical characteristic of the subject and extracting corresponding candidate characteristic digital data $CDD^c$;

comparing the obtained candidate characteristic digital data $CDD^c$ with the stored reference characteristic digital data CDD; and in case the candidate characteristic digital data $CDD^c$ is similar to the stored reference characteristic digital data CDD, within a given tolerance criterion, the subject is considered as corresponding respectively to a genuine object or individual validly associated with a genuine digital file.

Another aspect of the invention relates to a digital file belonging to a batch of a plurality of original digital files and secured according to the above mentioned securing method, each original digital file of the batch having its own digital data and corresponding digital verification key, said batch having a corresponding reference root digital signature, the digital file comprising a machine readable security marking including a representation of its digital data and its verification key. The digital data of the digital file may further include reference characteristic digital data CDD of a corresponding unique physical characteristic of an associated object or individual. Moreover, the unique physical characteristic of the associated object may be that of a material-based security marking applied on the associated object.

Another aspect of the invention relates to a system for verifying the authenticity of a digital file, or the conformity of a copy of such digital file, with respect to a marked original digital file belonging to a batch of original digital files secured according to the above mentioned securing method, comprising an imager having an imaging unit, a processing unit with a memory, and an image processing unit, the memory storing a reference root digital signature of a tree corresponding to the batch of original digital files, and the one-way function to calculate a digital signature of digital data and of a concatenation of digital signatures according to the nodes ordering of the tree and the tree concatenation ordering being programmed in the processing unit, said system being operable to:

have stored in the memory a test file being said digital file or said copy of the digital file;

read a representation of digital data and of a digital verification key on a digital security marking of the stored test file, and extract respectively corresponding test digital data and test digital verification key from said read representation;

verify whether the extracted test digital data and test digital verification key indeed correspond to the stored reference root digital signature by performing on the processing unit the programmed operations of:

calculating with the one-way function a test digital signature of the extracted test digital data, said test digital signature corresponding to a test leaf node in a test tree corresponding to the digital security marking of the test file;

extracting from the sequence of digital signatures in the test digital verification key, a digital signature of every other leaf node of the test tree having the same parent node than that of the test leaf node and calculating a digital signature of a concatenation of the test digital signature and the extracted digital signature of said every other leaf node, thus obtaining a digital signature of said same parent node of the test leaf node;

successively at each next level in the test tree and up to the penultimate nodes level, extracting from the sequence of digital signatures in the test digital verification key, a digital signature of every other non-leaf node of the test tree having the same parent node than that of the previous same parent node considered at the preceding step and calculating a digital signature of a concatenation of the digital signature of said respective every other non-leaf node and the obtained digital signature of said previous same parent node, thus obtaining a digital signature of said same parent node of said previous same parent node;

calculating a digital signature of a concatenation of the obtained digital signatures of the non-leaf nodes corresponding to the penultimate nodes level of the test tree, thus obtaining a candidate root digital signature of the root node of the test tree; and checking whether the obtained candidate root digital signature matches the stored reference root digital signature, whereby, in case said root digital signatures match, the system is configured to deliver an indication that the digital data of the test file are that of a genuine digital file.

In the above system, if the marked original digital file has an associated fields data block as mentioned above, the memory of the processing unit further storing the associated fields data block, the programmed operations of calculating a test digital signature corresponding to a test leaf node in a test tree corresponding to the digital security marking of the test file then comprise calculating with the one-way function a digital signature of a concatenation of the extracted test digital data and the stored fields data block.

In case the marked original digital file belongs to a batch of original digital files secured by including reference characteristic digital data of a corresponding unique physical characteristic of an associated object or individual as mentioned above, the above system being further equipped with a sensor connected to the processing unit and operable to detect a unique physical characteristic of an associated object or individual, and the processing unit being programmed to extract corresponding characteristic digital data from a detection signal received from the sensor, the system having stored in the memory reference characteristic digital data CDD corresponding to said unique physical characteristic of the associated object or individual, the system may further be operable to:

- detect with the sensor a unique physical characteristic of a subject being said associated object or individual, and extract corresponding candidate characteristic digital data $CDD^c$;
- compare the obtained candidate characteristic digital data $CDD^c$ with the stored reference characteristic digital data CDD; and
- in case the candidate characteristic digital data $CDD^c$ is similar to the stored reference characteristic digital data CDD, within a given tolerance criterion, deliver an indication that the subject is considered as genuine.

The present invention will be described more fully hereinafter with reference to the accompanying drawings in which like numerals represent like elements throughout the different figures, and in which prominent aspects and features of the invention are illustrated.

DETAILED DESCRIPTION

Figure 1:
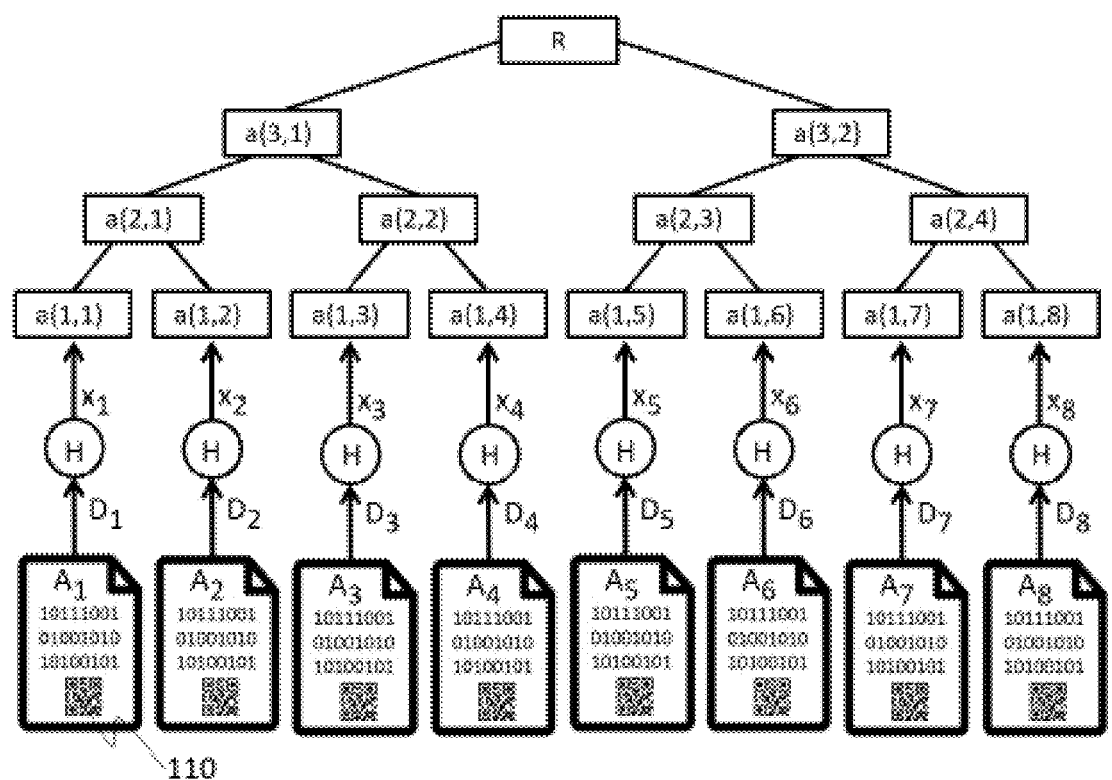
FIG. 1 is a schematic view of a general concept of securing a batch of original digital files according to the invention.

The present disclosure is here described in detail with reference to non-limiting embodiments illustrated in the drawings.

FIG. 1 illustrates a general concept of the invention relating to securing a batch of digital files and a method of computing an encoding of verifying information that may be associated with each digital file. FIG. 1 illustrates a group or digital "batch" of files $A_1, \ldots, A_8$, containing a digital representation of a machine readable security marking 110 (here illustrated by a 2D barcode). In what follows, the expression "digital security marking in 110" fact means "digital representation of a machine readable security marking 110". FIG. 1 in fact illustrates a group or "batch" of digital files and its associated tree wherein, for simplicity, only eight original digital files are shown: $A_1, \ldots, A_8$. Also for simplicity, the tree associated with the batch of files $A_1, \ldots, A_8$ is here a mere binary tree. A digital file may relate to a manufactured item or its packaging, a physical document or image, a package containing several items (such as a blister pack of medicine), or a container containing pallets of cartons of goods etc. Not only an object but even a person may be "associated" with a digital file in the sense of the embodiments of the invention; for example, authorized attendees at an event or members of a group, or members of a flock or herd, could carry some form of ID badge or be physically marked with some marking containing data recorded in a corresponding digital file.

A batch of digital files might, for example, relate to a common manufacturing run, items delivered by a particular supplier, items made or shipped during a time period, a set of related images, a group of people, a flock or herd, or any other user-defined grouping of any objects for which digital file $A_i$ (having digital content $D_i$) can be defined.

Any one of the articles shown on FIG. 1 could be a "virtual article" $A_v$, which is an optional software construct that may be included to enable encoding of selected data. This is explained further below. For example, one of the eight articles, e.g. article $A_8$, may in fact be a virtual article $A_v$ that is counted as belonging to the batch of eight articles, and is treated as any one of the other seven real articles since it may be processed substantially in the same way (although it does not correspond to a real object). Of course, a plurality of virtual articles $A_{v1}, A_{v2}, \ldots, A_{vk}$ can be used for encoding digital data and produce more robust article digital signatures (see below).

For each article $A_1, A_2, \ldots, A_7, A_8$ of the batch (possibly with $A_8 \equiv A_v$) respective article digital data $D_1, D_2, \ldots, D_7, D_8$ (possibly with $D_8 \equiv D_v$) are associated or extracted (or, in the case of virtual article $A_v$, created) using any appropriate method. This data might be some measure of physical characteristics, textual data such as completed form or product information, a serial number or other identifier, indications of content, a digital representation of an image, or any other information that the system designer chooses to associate with an article. The article digital data $D_i$ may be extracted from human readable data (e.g. alphanumeric data) marked on an associated article (e.g. printed on the article or on a label affixed on the article) by means of a reader capable to produce corresponding digital data of a digital file $A_i$. Further digital data (e.g. instruction for use of the associated article or safety instructions etc.) can be associated with the extracted data to constitute the article digital data $D_i$.

For the virtual article $A_v$, the associated digital data may include, for example, a batch identification number, the number of articles in the batch, a (pseudo-) random number for the sake of increasing security by increasing data entropy, date and/or time information, etc. One other form of associated data might be indications of allowable or non-permissible operations rules, expiration dates, etc. In short, the digital data $D_v$ may be anything that can be represented in digital form.

For each article of the batch, its respective digital article data $D_1, D_2, \ldots, D_7, D_8$ is preferably transformed mathematically in such a way that it is essentially concealed, although this is not an absolute any requirement for embodiment. This transformation applied to the article digital data $D_i$ of an article $A_i$ serves to create a corresponding digital signature $x_i$. This digital signature is produced by means of a one-way function, i.e. a function easy to compute but hard to invert (see S. Goldwasser and M. Bellare "Lecture Notes on Cryptography", MIT, July 2008, http://www-cse.ucsd.edu/users/mihir).

One such advantageous transformation is, for example, applying a hash function $H(\ ) = hash(\ )$ to the digital data, which generally has the property that it returns an output of a known bit length regardless of the size of the input: this technical effect is particularly useful for creating a digital signature of digital data of a digital file (e.g. associated to an article) regardless of the size of the digital data and that of the batch of corresponding digital files. The Hash function is a well-known example of a one-way function. If a cryptographic hash function such as the SHA (Secure Hash Algorithm) class of functions, for example, SHA-256, is used, then there are the additional benefits that the function is practically irreversible and collision resistant, that is, the probability is negligible that two different inputs will lead to the same output. As will be understood from the description below, this is also not a requirement of the invention, although it is advantageous for the same reasons as in other applications. As shown in FIG. 1, the values $x_1$, $x_2$, $x_3$, . . . , $x_8$ are the hash values, i.e. the associated article digital signatures, of the respective article datasets, that is, $x_j = H(D_j)$, for j=1, . . . , 8 (in case $A_8 \equiv A_v$, then $D_8 \equiv D_v$ and $x_8 \equiv x_v = H(D_v)$).

In order to shorten the signature, the article digital signature $x_j$ of article $A_j$ may even be just a sequence of a given plurality of bits of lower weights selected from the bits of the hash value $H(D_j)$: for example, with the SHA-256 hash function of the SHA-2 family, it suffices to retain only the 128 bits of lower weights from the 256 bits of the signature to still have a robust signature with respect to codebreaking attack.

FIG. 1 shows a batch of eight marked original articles $A_1$, . . . , $A_8$, each having a corresponding security 110 marking applied on it, and illustrates the method of securing the articles and their respective associated article digital data $D_1$, . . . $D_8$ (symbolically represented on files $A_i$ on FIG. 1 by a sequence of bits "0" and "1") by means of a tree of digital signatures of the digital data. Trees associated with digital signatures are well known (binary hash trees, n-ary hash trees, or Merkle trees), they generally have base nodes, or leaf nodes, which are used to build next (intermediate) level nodes by digitally signing a concatenation of the digital signatures associated with the leaf nodes according to a certain grouping of the leaf nodes. In case of a binary tree, the digital signatures associated with the first intermediate level nodes are respectively calculated by digitally signing (e.g. with a one-way hash function H, or a one-way elliptic curve function . . . ) a concatenation of the digital signatures associated with two consecutive leaf nodes. In case of a n-ary tree, the values of the first intermediate level nodes are obtained by concatenation of the values of n consecutive leaf nodes. A tree may as well have a more complex structure (mixed-trees) as the concatenation of the leaf nodes may be performed by pairs of consecutive nodes for certain leaf nodes, by triplet of nodes for other consecutive leaf nodes etc. For reasons of simplicity, a mere binary tree with eight leaf nodes is shown on FIG. 1: the respective values of the eight leaf nodes a(1,1), . . . , a(1,8) of the tree, respectively corresponds to the article digital signatures $x_1 = H(D_1)$, . . . , $x_8 = H(D_8)$. The value of the first index, i.e. "1", for all the leaf nodes indicates the first level (or base level) of the tree, and the second index running from 1 to eight indicates the (leaf) nodes ordering of the tree. The values of the next level (non-leaf) nodes, i.e. the four nodes of level two a(2,1), a(2,2), a(2,3) and a(2,4), are obtained by digitally signing a concatenation (symbolically represented by an operator "+", here by means of a hash function, of the values of pairs of leaf nodes, i.e. pairs of their child nodes in the tree. This grouping of child nodes for obtaining the values of the nodes of the next level defines the tree concatenation ordering. For simplifying the notations, we use the node symbol a(i,j) to also represent its associated value (i.e. its associated digital signature). Here, the tree has only two intermediate levels above the leaf nodes level, and the root node on top level. The root node level is in fact the last non-leaf node level of the tree. Thus, the values of the four non-leaf nodes of the next intermediate level are:

a(2,1)=H(a(1,1)+a(1,2)), i.e. a(2,1)=H(H($D_1$)+H(H($D_2$))), (as a(1,1) and a(1,2) are the child nodes of node a(2,1))
a(2,2)=H(a(1,3)+a(1,4))
a(2,3)=H(a(1,5)+a(1,6))
a(2,4)=H(a(1,7)+a(1,8))

and, for the next, penultimate, node level (here, level three) there are two node values:

a(3,1)=H(a(2,1)+a(2,2))
a(3,2)=H(a(2,3)+a(2,4)).

We remark that it is possible to choose a different tree concatenation ordering for each non-leaf node: for example, instead of having a(2,4)=H(a(1,7)+a(1,8)) we could define a(2,4)=H(a(1,8)+a(1,7)), which gives a different node value. Finally, the value of the root node R of the tree, or reference root digital signature, is obtained as: R=H(a(3,1)+a(3,2)). Due to the cascade of concatenations involved in a tree, it is practically impossible to retrieve a root value if any bit of digital data is changed in a node (particularly, in a leaf node). Moreover, if some virtual articles are included in the batch (of which virtual article digital data are only known to the system having produced the digital signatures of the leaf nodes of the tree), a counterfeiter will not be capable to retrieve the root digital signature even if knowing the digital data of all the produced (and marked) articles of the batch.

According to the invention, the reference root digital signature R of the batch of original digital files is made immutable, and thus forgery-proof, by being published in a (public) media accessible to a user having to check the authenticity of an article (or its associated data), or stored in a searchable root database accessible to the user, or, in a preferred mode, stored in a blockchain (or in a database secured by a blockchain) accessible to the user. The user may then store the reference value R acquired from these available sources.

For each original digital file $A_i$ of the batch, a corresponding digital verification key $k_i$ (or verification path) of the associated tree is then computed as a sequence of the respective digital signatures, from the leaf nodes level to the penultimate nodes level, of every other leaf node having the same parent node in the tree that the leaf-node corresponding to the digital signature of the original digital file $A_i$, and successively at each next level in the tree, of every non-leaf node having the same parent node in the tree that the previous same parent node considered at the preceding level. In the example of FIG. 1, there are eight verification keys $k_1$, . . . , $k_8$ respectively corresponding to the eight articles $A_1$, . . . , $A_8$ of the batch and their corresponding eight leaf nodes a(1,1), . . . , a(1,8):

1) for leaf node a(1,1)=$x_1$=H($D_1$) corresponding to article $A_1$, the verification key is $k_1$={a(1,2), a(2,2), a(3,2)}, from which the root digital signature value R can be retrieved via the following steps (executed according to the nodes ordering in the tree and the tree concatenation ordering):
   i) from leaf node a(1,1)=$x_1$ and leaf node a(1,2)=$x_2$ in $k_1$ (a(1,2) is the other leaf node having the same parent node, i.e. node a(2,1), that the leaf node corresponding to the article digital signature $x_1$, i.e. node a(1,1)), the parent node value a(2,1) is obtained by a(2,1)=H(a(1,1)+a(1,2)) (i.e. a(2,1)=H($x_1$+$x_2$)),
   ii) from the obtained a(2,1) and the next node value in $k_1$, i.e. a(2,2) of next non-leaf nodes level, which is a non-leaf node having the same parent node in the tree, i.e. node $a(3,1)$, that the previous same parent node considered at the preceding level, i.e. node $a(2,1)$, the parent node value $a(3,1)$ is obtained by $a(3,1)=H(a(2,1)+a(2,2))$, iii) from the obtained $a(3,1)$ and the next node value in $k_1$, i.e. $a(3,2)$ of the penultimate nodes level, which is a non-leaf node having the same parent node in the tree, i.e. the root node, that the previous same parent node considered at the preceding level, i.e. node $a(3,1)$, the root node value R is obtained by $R=H(a(3,1)+a(3,2))$.

Remark: in this example we have three steps i), ii) and iii), because the tree has three levels below the root node level and thus, the verification key contains three node values.

Thus, the value of the root node of the tree can be obtained as: $R=H(H(H(a(1,1)+a(1,2))+a(2,2))+a(3,2))$.

2) for leaf node $a(1,2)=x_2=H(D_2)$ corresponding to article $A_2$, the verification key is $k_2=\{a(1,1), a(2,2), a(3,2)\}$, from which the root value R can be retrieved via the following steps (executed according to the nodes ordering in the tree and the tree concatenation ordering):

i) from $a(1,2)=x_2$ and $a(1,1)=x_1$ in $k_1$ ($a(1,1)$ is the other leaf node having the same parent node, i.e. node $a(2,1)$, that the leaf node corresponding to the article digital signature $x_2$, i.e. node $a(1,2)$), the parent node value $a(2,1)$ is obtained by $a(2,1)=H(a(1,1)+a(1,2))$, ii) from the obtained $a(2,1)$ and the next node value in $k_2$, i.e. $a(2,2)$ of next non-leaf nodes level, which is a non-leaf node having the same parent node in the tree, i.e. node $a(3,1)$, that the previous same parent node considered at the preceding level, i.e. node $a(2,1)$, the parent node value $a(3,1)$ is obtained by $a(3,1)=H(a(2,1)+a(2,2))$, iii) from the obtained $a(3,1)$ and the next node value in $k_2$, i.e. $a(3,2)$ of the penultimate nodes level, which is a non-leaf node having the same parent node in the tree, i.e. the root node, that the previous same parent node considered at the preceding level, i.e. node $a(3,1)$, the root node value R is obtained by $R=H(a(3,1)+a(3,2))$.

Thus, the value of the root node of the tree can be obtained as: $R=H(H(H(a(1,1)+a(1,2))+a(2,2))+a(3,2))$.

3) for leaf node $a(1,3)=x_3=H(D_3)$ corresponding to article $A_3$, the verification key is $k_3=\{a(1,4), a(2,1), a(3,2)\}$, from which the root value R can be retrieved via the following steps (executed according to the nodes ordering in the tree and the tree concatenation ordering):

i) from $a(1,3)=x_3$ and $a(1,4)=x_4$ in $k_3$ ($a(1,4)$ is the other leaf node having the same parent node, i.e. node $a(2,2)$, that the leaf node corresponding to the article digital signature $x_3$, i.e. node $a(1,3)$), the parent node value $a(2,2)$ is obtained by $a(2,2)=H(a(1,3)+a(1,4))$, ii) from the obtained $a(2,2)$ and the next node value in $k_3$, i.e. $a(2,1)$ of next non-leaf nodes level, which is a non-leaf node having the same parent node in the tree, i.e. node $a(3,1)$, that the previous same parent node considered at the preceding level, i.e. node $a(2,2)$, the parent node value $a(3,1)$ is obtained by $a(3,1)=H(a(2,1)+a(2,2))$, iii) from the obtained $a(3,1)$ and the next node value in $k_3$, i.e. $a(3,2)$ of the penultimate nodes level, which is a non-leaf node having the same parent node in the tree, i.e. the root node, that the previous same parent node considered at the preceding level, i.e. node $a(3,1)$, the root node value R is obtained by $R=H(a(3,1)+a(3,2))$.

Thus, the value of the root node of the tree can be obtained as: $R=H(H(a(2,1)+H(a(1,3)+a(1,4)))+a(3,2))$.

4) for leaf node $a(1,4)=x_4=H(D_4)$ corresponding to article $A_4$, the verification key is $k_4=\{a(1,3), a(2,1), a(3,2)\}$, from which the root value R can be retrieved via the following steps (executed according to the nodes ordering in the tree and the tree concatenation ordering):

i) from $a(1,4)=x_4$ and $a(1,3)=x_3$ in $k_4$, the parent node value $a(2,2)$ is obtained by $a(2,2)=H(a(1,3)+a(1,4))$, ii) from the obtained $a(2,2)$ and the next node value in $k_4$, i.e. $a(2,1)$ of next non-leaf nodes level, the parent node value $a(3,1)$ is obtained by $a(3,1)=H(a(2,1)+a(2,2))$, iii) from the obtained $a(3,1)$ and the next node value in $k_4$, i.e. $a(3,2)$ of the penultimate nodes level, the root node value R is obtained by $R=H(a(3,1)+a(3,2))$.

Thus, the value of the root node of the tree can be obtained as: $R=H(H(a(2,1)+H(a(1,3)+a(1,4)))+a(3,2))$.

5) for node $a(1,5)=x_5=H(D_5)$ corresponding to article $A_5$, the verification key is $k_5=\{a(1,6), a(2,4), a(3,1)\}$, from which the root value R can be retrieved via the following steps (executed according to the nodes ordering in the tree and the tree concatenation ordering):

i) from $a(1,5)=x_5$ and $a(1,6)=x_6$ in $k_5$, the parent node value $a(2,3)$ is obtained by $a(2,3)=H(a(1,5)+a(1,6))$, ii) from the obtained $a(2,3)$ and the next node value in $k_5$, i.e. $a(2,4)$ of next non-leaf nodes level, the parent node value $a(3,2)$ is obtained by $a(3,2)=H(a(2,3)+a(2,4))$, iii) from the obtained $a(3,2)$ and the next node value in $k_5$, i.e. $a(3,1)$ of the penultimate nodes level, the root node value R is obtained by $R=H(a(3,1)+a(3,2))$.

Thus, the value of the root node of the tree can be obtained as: $R=H(a(3,1)+H(H(a(1,5)+a(1,6))+a(2,4)))$.

6) for node $a(1,6)=x_6=H(D_6)$ corresponding to article $A_6$, the verification key is $k_6=\{a(1,5), a(2,4), a(3,1)\}$, from which the root value R can be retrieved via the following steps (executed according to the nodes ordering in the tree and the tree concatenation ordering):

i) from $a(1,6)=x_6$ and $a(1,5)=x_5$ in $k_6$, the parent node value $a(2,3)$ is obtained by $a(2,3)=H(a(1,5)+a(1,6))$, ii) from the obtained $a(2,3)$ and the next node value in $k_6$, i.e. $a(2,4)$ of next non-leaf nodes level, the parent node value $a(3,2)$ is obtained by $a(3,2)=H(a(2,3)+a(2,4))$, iii) from the obtained $a(3,2)$ and the next node value in $k_6$, i.e. $a(3,1)$ of the penultimate nodes level, the root node value R is obtained by $R=H(a(3,1)+a(3,2))$.

Thus, the value of the root node of the tree can be obtained as: $R=H(a(3,1)+H(H(a(1,5)+a(1,6))+a(2,4)))$.

7) for node $a(1,7)=x_7=H(D_7)$ corresponding to article $A_7$, the verification key is $k_7=\{a(1,8), a(2,3), a(3,1)\}$, from which the root value R can be retrieved via the following steps (executed according to the nodes ordering in the tree and the tree concatenation ordering):

i) from $a(1,7)=x_7$ and $a(1,8)=x_8$ in $k_7$, the parent node value $a(2,4)$ is obtained by $a(2,4)=H(a(1,7)+a(1,8))$, ii) from the obtained $a(2,4)$ and the next node value in $k_7$, i.e. $a(2,3)$ of next non-leaf nodes level, the parent node value $a(3,2)$ is obtained by $a(3,2)=H(a(2,3)+a(2,4))$, iii) from the obtained $a(3,2)$ and the next node value in $k_7$, i.e. $a(3,1)$ of the penultimate nodes level, the root node value R is obtained by $R=H(a(3,1)+a(3,2))$.

Thus, the value of the root node of the tree can be obtained as: $R=H(a(3,1)+H(a(2,3)+H(a(1,7)+a(1,8))))$.

8) for node $a(1,8)=x_8=H(D_8)$ corresponding to article $A_8$, the verification key is $k_8=\{a(1,7), a(2,3), a(3,1)\}$, from which the root value R can be retrieved via the following steps (executed according to the nodes ordering in the tree and the tree concatenation ordering):

i) from $a(1,8)=x_8$ and $a(1,7)=x_7$ in $k_8$, the parent node value $a(2,4)$ is obtained by $a(2,4)=H(a(1,7)+a(1,8))$, ii) from the obtained a(2,4) and the next node value in $k_8$, i.e. a(2,3) of next non-leaf nodes level, the parent node value a(3,2) is obtained by a(3,2)=H(a(2,3)+a(2,4)), iii) from the obtained a(3,2) and the next node value in $k_8$, i.e. a(3,1) of the penultimate nodes level, the root node value R is obtained by R=H(a(3,1)+a(3,2)).

Thus, the value of the root node of the tree can be obtained as: R=H(a(3,1)+H(a(2,3)+H(a(1,7)+a(1,8)))).

Generally, for retrieving a (candidate) root node value by starting from a given leaf node value and the node values specified in the verification key associated with said given leaf node, the following steps are performed:

extracting from the sequence of node values in the verification key, a node value (i.e. a digital signature value) of every other leaf node of the tree having the same parent node than that of the given leaf node and calculating a digital signature of a concatenation of the given node value and, respectively according to the ordering of nodes in the tree and the tree concatenation ordering, the extracted node value of said every other leaf node, thus obtaining a digital signature of said same parent node of the given leaf node;

successively at each next level in the tree and up to the penultimate nodes level:

extracting from the sequence of node values in the verification key, a node value of every other non-leaf node of the tree having the same parent node than that of the previous same parent node considered at the preceding step, and calculating a digital signature of a concatenation of the node value of said respective every other non-leaf node and the obtained digital signature of said previous same parent node, according to the ordering of nodes in the tree and the tree concatenation ordering, thus obtaining a node value of said same parent node of said previous same parent node; and calculating a digital signature of a concatenation of the obtained node values of the non-leaf nodes corresponding to the penultimate nodes level of the tree according to the ordering of nodes in the tree and the tree concatenation ordering, thus obtaining a root digital signature of the root node of the tree.

As it is clear from the above example, the root node value R can finally be retrieved from any given leaf node value by a digital signature of a concatenation of this leaf node value with only the node values specified in the corresponding verification key. Thus, the volume of data in the verification information that is necessary for retrieving the root node value is clearly much lower than the volume of data necessary for calculating the reference root node value (i.e. based only on the leaf node values, by calculating all the non-leaf node values of the intermediate levels of the tree): this is an advantage of the invention in view of the constraint of limited size available on a security marking (like a two-dimensional barcode).

According to the invention, the digital security marking 110 of a digital file $A_i$ of a batch of articles includes the verification information $V_i$ that allows both online and offline checking operations of authenticity of the marked file, of conformity of its associated data with respect to that of the genuine marked file, by providing a unique, immutable and forgery-proof link between the digital data $D_i$ of $A_i$ and the fact that the marked original digital file $A_i$ belongs to a given batch of genuine articles, while keeping a bit size of a digital representation of this verification information $V_i$ at a level compatible with a data content of a two-dimensional machine readable barcode that can be easily read by a conventional reader: this verification information comprises the article digital data $D_i$ and the corresponding verification key $k_i$, $V_i=(D_i,k_i)$. The checking operations includes retrieving the batch value, or reference root digital signature R of the tree associated with the batch, by first reading the digital data $D_i$ and the corresponding digital verification key $k_i$ on the machine readable security marking 110 of digital file $A_i$, then calculating a candidate digital signature $X_i$ by means of a one-way function of the read digital data $D_i$ as $X_i=H(D_i)$, and calculating a candidate root digital signature $R^c$ as explained above from a digital signature of a concatenation of $X_i$ and node values of the tree according to the sequence of node values indicated in the digital verification key $k_i$. This securing scheme, which has the advantage of not necessitating data encryption and thus, management of encryption/decryption keys (particularly, no cryptographic key is included in the digital security marking), is much more robust with respect to codebreaking attack compared to conventional encryption of data by means of public encryption key-private decryption key (like RSA "Rivest-Shamir-Adleman" system, for example). As a result, the size of digital data to be represented in the digital security marking according to the invention is compact and allows to use conventional representation of 2D barcodes (e.g. a QR code) (particularly useful for print-ready digital files), and thus conventional barcode readers (or even a mere programmed smartphone having a camera), while providing a very high level of robustness against codebreaking attacks. Moreover, this security marking is compatible with both online (via a server communicating with a code reader) and offline (via a programmed code reader) check of authenticity of a marked digital file and conformity of its data with respect to that of a genuine (original) digital file. Also, according to the invention, the representation of digital data $D_i$ and that of key data $k_i$ may differ, the data concatenation scheme and/or the one-way function may depend on node level in the tree, which provide additional levels of robustness with respect to codebreaking attacks.

Preferably, in order to further reduce the size of digital data (i.e. verification information V) to be included in a digital security marking, if the digital data $D_i$ of the respective original digital files $A_i$ of the batch are spread between given fields that are common to all the digital files of the batch, digital data relating to these fields are not included in each digital data Di but are clustered in a separate fields data block FDB associated with the batch of digital files, and:

the digital signature $x_i$ of an original digital file $A_i$ of the batch is then calculated with the one-way function H of a concatenation of the corresponding digital data $D_i$ and the digital data of the fields data block FDB, i.e. $x_i=H(D_i+FDB)$; and the reference root digital signature R is made available to the user together with the associated fields data block FDB (which makes the fields data block also immutable).

In a variant of the invention, the fields data block FDB is made accessible to the user independently of the reference root digital signature.

The above size reduction is possible in most cases, as most of data associated with the digital files of a batch are classified in accordance with some fields for structuring the data: e.g. for a pharmaceutical product associated with a secured digital file, the indications "serial number", "expiry data" etc., only the data associated with these fields are included in $D_i$ (e.g. 12603, May 2020 etc.) while the common names of the fields "serial number", "expiry data" etc. are in the fields data block FDB.

There are many known methods for encoding information. Any such method may be used in implementations of any embodiment of this invention. One common form of marking is a well-known QR code (as a representation of a 2D image included in a digital file). As is well known, for a given area, the more data a QR code is able to encode, the higher the module density (roughly, density of black/white "squares") it has and the greater resolution it requires to print and read. In addition to its density (in number of modules squared), QR codes are also generally classified depending on what level of error correction they include. At present, the four different standard "levels", L, M, Q, and H, each representing the degree of "damage", that is, data loss, the QR code image can sustain and recover from. The levels L, M, Q, and H can sustain roughly 7%, 15%, 25% and 30% damage, respectively.

The following table shows at least approximate values for different QR code versions:

| Version | Size (in modules) | Number of encodable bits | |
|---|---|---|---|
| | | EECC level L | EECC level H |
| 10 | 57 × 57 | 22192 | 9976 |
| 25 | 117 × 117 | 110208 | 44304 |
| 40 | 177 × 177 | 223648 | 110208 |

Not all of the bits may be used to encode a data "load", however, since some modules are used for scan targets, a mask pattern, and the error-correction modules. There is thus a trade-off between the amount of information that a QR code (or whatever marking 110 is used) can encode, and how much information is included in a verification information V and must be encoded.

For a chosen type of digital security marking 110 (such as a QR code), with a limited encoding capacity, a suitable one-way function H should therefore also be chosen: a function of which output is too large in terms of required bits may be impossible to use at all, and a function of which range is too small may not be secure enough. Moreover, in many applications, scalability may be an issue. For example, some data security schemes involve signatures that grow as the number of members of a batch increases, and that could impermissibly limit the size of a batch from the perspective of how many bits the digital security marking 110 can encode. This is why, according to a preferred mode of the invention, the type of function chosen is the one-way hash function of the SHA-2 family.

A computation module (not shown) is preferably included within a securing system to execute the code provided for performing the computations for digitally signing the digital data of the original digital files of a batch, for determining the digital verification keys for the different digital files, and for calculating the reference root digital signature of the corresponding tree. The securing system may also include suitable modules for inputting (pre-programmed) values corresponding to the digital data $D_v$ of the virtual digital file(s) $A_v$. It would also be possible to perform the file-related hashing computations externally (e.g. on a connected distant server), for example, wherever the digital files are made, so as to avoid having to transmit raw digital data $D_i$ over a network from that site (or sites) to the securing system, if that is a concern. For each digital file $A_i$, corresponding verification information $V_i$ is compiled and is encoded (represented) in some form of machine readable digital security marking 110 that is then included in the respective article.

For any "virtual" digital file $A_v$, its corresponding verification information $V_v=(D_v,k_v)$ may be associated internally with it by the securing system. The verification information generally at least includes, for any digital file $A_i$ of a batch of digital files, the corresponding digital data $D_i$ and the corresponding digital verification key $k_i$: i.e. $V_i=(D_i,k_i)$.

Additional digital data may further be associated with a digital file and may include, for example, the batch value, i.e. reference root digital signature R, or any other information the system designer (or system administrator) chooses to include, such as, for example, an associated item serial number, batch ID, date/time information, product name, a URL that points to other, online information associated with either the individual item (such as an image of the item, or of its labelling or packaging, etc.), or the batch, or the supplier/manufacturer, a telephone number one may call for verification, etc. The additional digital data may be stored in a searchable information database accessible to a user (via an information database interface).

Once the digital verification $k_i$ of an original digital file $A_i$ has been calculated, and included (i.e. via encoding or any chosen data representation), together with the corresponding digital data $D_i$, in the machine readable digital security marking 110 in the digital file $A_i$, the resulting marked original digital file and its associated digital data are in fact secured against forgery and tampering.

A user, recipient of a digital file such as $A_1$ for example, may then scan (or otherwise read) with an imager (reader) the digital security marking of $A_1$ and extract the digital data $D_1$ and the digital verification key $k_1$, (and any other information that may have been encoded into the marking). For the sake of verification of the marked digital file $A_1$, the user must first retrieve the verification information $V_1=(D_1,k_1)$ from the digital security marking 110 of $A_1$ and thus, calculate the digital signature $x_1$ from the extracted digital data $D_1$: to do that the user must know the one-way function to be used for calculating a digital signature, here the one-way function H( ) (e.g. a SHA-256 hash), and then perform the operation $x_1=H(D_1)$ to obtain the full data $(x_1,k_1)$ necessary to calculate a corresponding candidate root digital signature $R^c$. The user may for example receive the one-way function securely (for example, using a public/private key pair) or by requesting this from the digital file provider or whichever entity having created the signatures and keys, or having it already programmed in a user's processing unit of its imager.

Next, in order to calculate such candidate root digital signature $R^c$, the user will need to further know the type of data concatenation scheme (for concatenating node values via H(a(i,j)+a(i,k)) to be used for that: the user may receive this information in any known manner, either securely (for example, using a public/private key pair) or simply by requesting this from the digital file provider or whichever entity created the verification data, or having it already programmed in the user's processing unit. However, the concatenation scheme my in fact correspond to a mere conventional "joining end-to-end" of the two digital data blocks respectively corresponding to the two node values: in this case, no specific scheme must be transmitted to the user. In some variants, the concatenation scheme may further insert a concatenation block, which may contain data specific to the rank or level of the concatenated digital data blocks in the tree, with the result of making even more difficult a codebreaking attack.

Knowing the data concatenation scheme, the user can then compute (e.g. via the suitably programmed imager) the candidate root digital signature $R^c$ as explained above by step by step digitally signing a concatenation of the digital signature $x_1$ and node values according to the sequence of nodes specified in the digital verification key $k_1$, see above the item "1)" relating to the node a(1, 1), executed according to the nodes ordering in the tree and the tree concatenation ordering. Here, the candidate root digital signature is obtained as (the nodes ordering in the tree being given by the respective indexes (i,j) of the level and rank in the level):

$$R^c = H(H(H(a(1,1)+a(1,2))+a(2,2))+a(3,2)).$$

This calculated candidate root digital signature $R^c$ should then be equal to the available (or published) reference R value: this value may have been previously acquired by the user and/or already stored in a memory of the imager's processing unit, it could also be a value that the recipient requests and receives from the system administrator in any known manner. If the candidate $R^c$ and the available reference root digital signatures R match, this computation then verifies the information in the digital secure marking 110 and confirms that the digital file A is from the right batch.

A link to access the reference root digital signature R for the batch corresponding to the digital file $A_1$ could be included in the digital security marking 110 (for example, a web address, if R can be retrieved on a corresponding web site), although it is not a preferred variant.

A user, recipient of a digital file such as $A_1$ for example, may then scan (or otherwise read) with a reader the digital security marking on $A_1$ and extract the digital data $D_1$ and the digital verification key $k_1$, (and any other information that may have been encoded into the digital security marking). An example of reader is a computer with a display, or even a (programmable) smartphone. For the sake of verification of the marked file $A_1$, the user must first retrieve the verification information $V_1=(D_1,k_1)$ from the digital security marking on $A_1$ and thus, calculate the digital file signature $x_1$ from the extracted digital data $D_1$: to do that the user must know the one-way function to be used for calculating a digital signature, here the hash function H( ), and then perform the operation $x_1=H(D_1)$ to obtain the full data $(x_1,k_1)$ necessary to calculate a corresponding candidate root digital signature $B^c$. The user may for example receive the one-way function securely (for example, using a public/private key pair) or by requesting this from the digital file provider or whichever entity having created the signatures and keys, or having it already programmed in a user's processing unit of its reader.

Preferably, the reference root digital signature (i.e. "batch value") R is stored in a searchable root database that can be accessed (via a communication link) by the user by means of its computer equipped with a communication unit, as this is the case with the above example of a smartphone. The user having to verify the digital file A can just send a root request with its smartphone to the address of the database, via an access interface of the database, the request containing the digital data $D_1$ read on the digital security marking 110 of $A_1$ (or the calculated digital signature $x_1=H(D_1)$) allowing to retrieve the corresponding reference batch value R, and the access interface will return the reference root digital signature R to the smart phone. The database may be secured by a blockchain in order to strengthen the immutability of the stored root digital signatures. An advantage of the invention is to make the link between a physical object, i.e. an original digital file stored in a memory, and its attributes, i.e. the associated digital data and its belonging to a specific batch of digital files, practically immutable through the corresponding root digital signature.

The above mentioned verification process of a digital file $A_i$ may also serve to authenticate human readable data content of $A_i$ on a corresponding printed version of the digital file $A_i$. Indeed, a user can read on a display of a computer the corresponding digital data $D_i$ as decoded from the digital security marking in the digital file $A_i$ by the computer, and visually check that the displayed information is consistent with the printed data on the printed version of the digital file.

In a preferred embodiment, the digital data $D_i$ further include characteristic digital data (CDD) of corresponding unique physical characteristic of an object, or an individual, associated with the marked original digital file $A_i$ that can be used for (materially) authenticating the associated object, or the associated individual, by comparing the characteristic digital data extracted from the digital security marking and corresponding detection data of the unique physical characteristic obtained from a suitable sensor. Thus, with the characteristic digital data corresponding to the unique physical characteristic in a digital file $A_i$ being $CDD_i$, the corresponding unique physical signature data $UPS_i$ can be obtained by encoding of $CDD_i$ (preferably by means of a one-way function): for example, by taking a hash of the characteristic digital data $CDD_i$, i.e. $UPS_i=H(CDD_i)$. However, any other known encoding could be used instead: for example, in order to have a short signature, it is possible to use an elliptic curve digital signature algorithm. As an illustrative very simplified example of characteristic digital data $CDD_i$ corresponding to a unique physical characteristic of an object $OBJ_i$ associated with a digital file $A_i$, we consider a mere digital image obtained by imaging the object $OBJ_i$ (or a specific zone on $OBJ_i$), for example by means of the camera of a smartphone, the corresponding unique physical signature data $UPS_i$ being, for example, a hash of the digital image, $UPS_i=H(CDD_i)$. The characteristic digital data $CDD_i$ having generated the signature $UPS_i$ is the reference characteristic digital data for $A_i$ and the obtained signature $UPS_i$ is the corresponding reference unique physical signature data for $A_i$. Preferably, $UPS_i$, i.e. the reference unique physical signature data for digital file $A_i$, is stored in a searchable database or in a blockchain (or in a database secured by a blockchain) accessible to the users (for example, via a request containing the digital data $D_i$ read on the digital security marking in the digital file $A_i$, or its corresponding digital file signature $x_i$). Thus, the stored $UPS_i$ acquires an immutable character. A copy of $CDD_i$ may be further stored in the memory of the user's smartphone (or reader or computer). In a variant of the embodiment, a copy of $UPS_i$ may also be further stored in the memory of the user's smartphone (or reader or computer) to allow offline checking operation.

A check of authenticity of the digital file $A_i$ may be performed by extracting candidate characteristic digital data $CDD_i^c$ from the digital data $D_i$ read (here, with a decoding application running on the smartphone) on the digital security marking included in the digital file $A_i$, and comparing it with the reference characteristic digital data $CDD_i$ stored in the memory of the smartphone: in case of matching $CDD_i^c=CDD_i$, the digital file $A_i$ is considered as genuine (its digital content corresponds to that of a genuine marked original digital file). If the reference characteristic digital data $CDD_i$ is not stored in the memory of the smartphone, but instead the reference unique physical signature data $UPS_i$ is stored in the memory of the smartphone (with the advantage of taking up much less memory compared with CDD), then the authenticity of $A_i$ can still be checked by verifying that the candidate unique physical signature data $UPS_i^c$ obtained by calculating the hash value of the candidate characteristic digital data $CDD_i^c$ extracted from the digital data $D_i$, i.e. $UPS_i^c = H(CDD_i^c)$, matches the reference unique physical signature data $UPS_i$ stored in the memory.

A user may further check the authenticity of a received digital file $A_i$, still via offline (self-verifying) process, by detecting said unique physical characteristic on the object or individual associated with the digital file $A_i$, by means of a sensor capable to perform such measurement (here, the camera of the smartphone), and obtaining a candidate characteristic digital data $CDD_i^c$ from the detected characteristic (here, a digital image taken by the smartphone). Then, the user can compare (via the image processing unit of its smartphone, or visually on a display of the smartphone) the obtained $CDD_i^c$ with a copy of the reference $CDD_i$ (stored in the memory of the smartphone): in case of "reasonable" matching $CDD_i^c \approx CDD_i$ (i.e. the two digital data agree within some given tolerance or similarity criterion), the digital file $A_i$ is considered as genuine (i.e. its digital content corresponds to that of a genuine marked original digital file).

Moreover, the user may also further calculate the corresponding candidate unique physical signature data from the copy of the reference $CDD_i$ stored in the memory of the smartphone as $CDD_i^c = H(CDD_i)$, and compare it with the reference physical signature data $UPS_i$ stored in the memory of the smartphone: in case of matching $UPS_i^c = UPS_i$, the digital file $A_i$ is confirmed as being genuine with an even higher degree of confidence (as merely one bit of difference is enough to cause a mismatch). Moreover, in case of matching, the digital data $D_i$ associated with $A_i$, which has been verified as corresponding to that of a genuine digital file, as explained above by retrieving the corresponding batch value R from the read verification information $(D_i, k_i)$ stored in the digital security marking in $A_i$, is also authenticated.

In a variant of the embodiment, the checking of authenticity of a digital file $A_i$ by a user may be performed via online process. In this case, the reference data, i.e. the characteristic digital data CDDi and/or the reference unique physical signature data UPSi, are stored in a searchable database accessible to the user wherein the reference data relating to a digital file $A_i$ are stored in association with, respectively, the corresponding digital data $D_i$ (included in the digital security marking in $A_i$) or with the corresponding digital file signature $x_i$ (that can be calculated by the user once the data $D_i$ is extracted from the digital security marking via the operation $x_i = H(D_i)$): the reference data can be requested by sending to the database a query containing, respectively, $D_i$ or $x_i$.

A conventional way of securing an object is to apply on it a material-based security marking (possibly tamperproof), i.e. a marking having detectable intrinsic physical or chemical property that is very hard (if not impossible) to reproduce. If an appropriate sensor detects this intrinsic property on a marking, this marking is then considered as genuine with a high degree of confidence, and thus also the corresponding marked object. There are many examples of such known authenticating intrinsic properties: the marking can include some particles, possibly randomly dispersed, or has a specific layered structure, having intrinsic optical reflection or transmission or absorption or even emission (luminescence, for example, or polarization or diffraction or interference . . . ) properties, possibly detectable upon specific illumination conditions with "light" of specific spectral content. This intrinsic property can result from the specific chemical composition of the material of the marking: for example, luminescent pigments (possibly not commercially available) can be dispersed in an ink used for printing some pattern on the object and are used to emit specific light (for example, in a spectral window within the infrared range) upon illumination with a specific light (for example, with light in the UV spectral range). This is used for securing for example. Other intrinsic properties can be used: for example, the luminescent particles in the marking can have a specific luminescence emission decay time after illumination with an appropriate excitation light pulse. Other types of intrinsic properties are the magnetic property of included particles, or even a "fingerprint" property of the object itself such as, for example, the relative positioning of inherently randomly dispersed fibers of a paper substrate of a document, in a given zone on the document, which, when observed at sufficient resolution, can serve to extract a unique characterizing signature, or some random printing artefacts of data printed on the object which, viewed with sufficient magnification, can also lead to a unique signature etc. . . . . The main problem with an inherent fingerprint property of an object is its robustness with respect to aging or wear. However, a material-based security marking does not always allow also securing data associated with the marked object: for example, even if a document is marked with a material-based security marking like a logo printed with a security ink in some zone of the document, data printed on the remaining part of the document can still be falsified. Moreover, too complex authenticating signatures often necessitate significant storage capabilities involving external databases, and communication links for querying such databases, so that offline authentication of an object is not possible. According to the invention, an object marked by means of a material-based security marking and associated with a (digitally) marked digital file is secured by the entanglement resulting from the fact that the characteristic digital data corresponding to the unique physical characteristic of the marked object, or its corresponding unique physical signature data, is immutably (thanks to the publication or storage of the aggregated digital signature in a blockchain) and forgery-proof linked with the digital data in the digital security marking being part of the associated digital file. The invention can thus be used for both securing a batch of objects and a corresponding batch of associated digital files.

Of course, any other known intrinsic physical/chemical property can be used to obtain the characteristic digital data $CDD_i$ relating to a unique physical characteristic of an object $OBJ_i$ associated with a digital file $A_i$, and the corresponding unique physical signature data $UPS_i$. As another illustrative example, it is possible to print a 2D barcode forming a material-based security marking on an object with a security ink including a luminescent pigment having its characteristic decay time constant as well as its light excitation wavelength window and its luminescence emission wavelength window: the result is an ink having a specific reference decay time value τ that serves as a material "fingerprint" of the ink. It suffices to illuminate the barcode with excitation light in an illumination wavelength window covering the pigment excitation wavelength window, and collect a resulting luminescence light from the barcode with a sensor capable to detect light intensity within the luminescence emission wavelength window in order to authenticate the barcode, and thus the object. For example, a user's reader may be equipped with a flash capable to deliver the excitation light to the barcode, a photodiode capable to collect the corresponding luminescence light intensity profile I(t) (over a detection time interval) from the barcode, and the reader's CPU being programmed to calculate a decay time value from the collected intensity profile I(t). For example, the excitation wavelength window may be within the UV (ultra violet) band and the emission wavelength window within the IR (infrared) band. If, during verification of the object, the luminescence light intensity collected by the user's imager shows a characteristic decay over time corresponding to a candidate decay time $\tau_c$, then the ink, and consequently the object, is considered as genuine if $\tau_c \approx \tau$ (within a given range of tolerance). In this case, the characteristic digital data $CDD_i$ of a marked object $OBJ_i$ includes at least the reference decay time value $\tau$ (and possibly data relating to the excitation wavelength window and the emission wavelength window). As it is clear from the above examples, including reference (unique) characteristic digital data in the verification information of a digital security marking of an associated digital file $A_i$ has the technical effect of providing a forgery-proof link between the digital data of the digital file and the authentication data of its associated object.

Figure 2A:
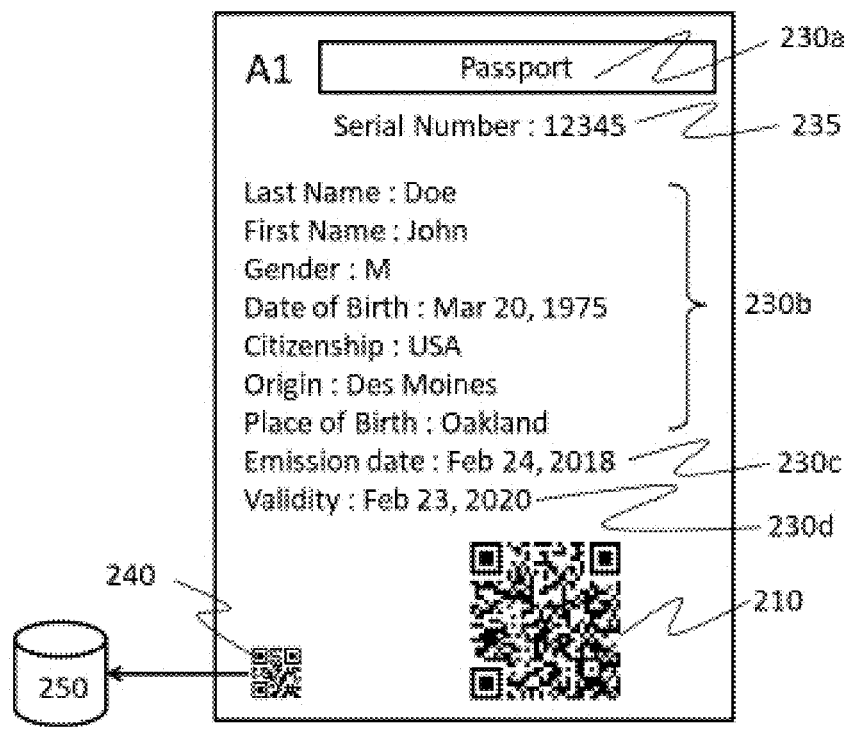
FIG. 2A illustrates a secured digital biometric passport as an example of digital biometric identity document secured according to the invention.

Another illustrative embodiment of the invention relates to a batch of biometric identification documents, e.g. biometric digital passports, as shown on FIG. 2A. Each digital passport, as a digital file, is associated with a corresponding individual, i.e. the owner of the passport. For clarity reason, the digital data of $A_1$ is represented on FIG. 2A as equivalent textual and alphanumerical information (i.e. human readable), for example, as it could be displayed from a digital pdf ("Portable Document Format") file, and the digital security marking is shown as equivalent conventional QR code two-dimensional pattern. This embodiment of the invention is particularly useful for creating printable digital files, like print-ready digital files, to allow a printer to deliver a printed secured document directly from a corresponding secured printable digital file (e.g. a digital file relating to identity document, diploma, contract etc.).

In this example we still use a hash function as a one-way function for signing the passport digital data, preferably a SHA-256 hash function in view of its well-known robustness. Indeed, in view of a given size of the batch, the hash function that is selected (having its known bucket listing) for the purpose of signing the passport digital data is thus an example of a one-way encryption function such that each distinct digital passport has its distinct digital passport signature, which thus make the signature unique. The domain of a hash function (i.e. the set of possible keys) being larger than its range (i.e. the number of different table indices), it will map several different keys to a same index which could result in collisions: such collisions can be avoided, when the size of the batch is known, by considering the bucket listing associated with the hash table of a hash function and retaining only a function giving zero collisions, or by independently choosing a hash-table collision resolution scheme (for example, such as coalesced hashing, cuckoo hashing, or hopscotch hashing). FIG. 2A shows an example of digital biometric passport $A_1$ secured with a machine readable digital security marking 210 (here a QR code) encoded in $A_1$, and comprising passport digital data 230 containing conventional passport data, e.g. digital data representing a title of the document 230a ("Passport"), a set of biography data of the owner of the passport 230b: last name ("Doe"), first name ("John"), gender ("M"), date of birth ("Mar. 20, 1975"), citizenship ("USA"), origin ("Des Moines"), place of birth ("Oakland"), a date of emission of the passport 230c ("Feb. 24, 2018") and a validity period 230d ("Feb. 23, 2020"). These passport digital data may further comprise some (unique) serial number(s) 235 assigned by the authority delivering the passport (here "12345"). The passport digital data further comprise biometry data of the owner of the passport as characteristic digital data (CDD) corresponding to a unique physical characteristic of an individual associated with the digital passport. A machine readable representation 230e (e.g. an alphanumeric one) of data characterizing said unique physical characteristic (not shown), corresponding to said biometry data, is associated with the passport digital data 230. A representation of digital data is to be understood in a broad sense of the term: this representation of data only needs to enable retrieving the original digital data. The machine readable data representation 230e, i.e. the biometry data, of the unique physical characteristic may correspond, for example, to fingerprint identification data or iris identification data of the owner of the digital passport. For example, biometry data 230e corresponding to a fingerprint of a person may result from an analysis of a set of specific minutia features of fingerprint ridges like ridge ending, bifurcation and short ridges (according to the conventional Henry System of Classification).

Thus, for a given digital passport $A_j$ of the batch of u delivered digital biometric passports, here with $\mu=1024$, the associated passport digital data $D_j$ includes the above mentioned digital data 230a-230e. In a variant of the embodiment, the associated passport digital data $D_j$ may only include the values of the fields which are common to all the delivered passports, while the fields in common, i.e. "Passport", "Last Name", "Gender", "Date of Birth", "Citizenship", "Origin", "Place of Birth", "Emission date" and "Validity" are included in a separate fields data block FDB as explained above: for example, $D_1$ only contain a representation of the field values "Doe", "John", "M", "Mar. 20, 1975", "USA", "Des Moines", "Oakland", "Feb. 24, 2018" and "Feb. 23, 2020".

Preferably, additional passport digital data are associated with the above mentioned passport digital data 230. For example, a digital image of the fingerprint pattern of the owner of the passport, or a digital identity photograph etc. In a variant of the embodiment, these additional passport digital data are stored in a searchable information database 250 that can be searched via an information request containing some passport data (for example, the name of the owner or the biometry data or data from the security marking or the unique serial number 235) to retrieve the corresponding fingerprint pattern data and receive it back. Preferably, a link to the information database 250 is included, as information access data 240, in the digital passport: here this information access data is encoded in a digital representation of a QR code containing a reference index to retrieve corresponding additional data in the information database 250. However, in a variant of passport control operation involving access to a distant information database (online operation), the QR code could contain, for example, the URL of the information database that is accessible via the web.

A digital passport signature with a one-way hash function of the passport digital data $D_j$ corresponding to the passport digital data 230a-230e of the digital passport $A_j$ is then calculated by means, for example, of the above mentioned robust SHA-256 hash function to obtain the corresponding (unique) passport digital signature $x_j=H(D_j)$. In a same way, the passport digital signatures of all the digital passports in the batch, for all the different owners, are calculated.

From all the signatures of the passports in the batch, a reference root digital signature R is calculated according to a tree ordering and tree concatenation ordering of an associated (binary) tree, as explained above. As there are µ=1024 passports in the batch, the corresponding binary tree has 1024 leaf nodes a(1,1), . . . , a(1024) for the first level, 512 non-leaf nodes a(2,1), . . . , a(2,512) for the second level, 256 non-leaf nodes a(3,1), . . . , a(3,256) for the third level etc. . . . , up to the penultimate nodes level (here, level 10) with non-leaf nodes a(10,1) and a(10,2), and the top node corresponding to the root node R (level 11 of the tree). The leaf-node values are $a(1,j)=x_j=H(D_j)$, j=1, . . . , 1024, the second level node values are a(2,1)=H(a(1,1)+a(1,2)), . . . , a(2,512)=H(a(1,1023)+a(1,1024)), etc., and the reference root digital signature R is R=H(a(10,1)+a(10,2)). Each digital verification key $k_j$ is thus a sequence of 10 node values. The digital security marking 210 of the digital passport $A_j$ includes the passport digital data $D_j$ and the corresponding digital verification key $k_j$ (i.e. the verification information $V_j=(D_j,k_j)$).

The operation of checking that the passport digital data $D_j$ and the digital verification key $k_j$ in the digital security marking 210 of a biometric digital passport $A_j$ indeed correspond to passport data of a genuine biometric digital passport belonging to the batch of µ biometric digital passports having the batch value R only necessitates calculating the passport digital signature $x_j=H(D_j)$ and verifying that $x_j$ and the digital verification key $k_j$ allow retrieving the available corresponding reference root digital signature R via the composition of ten times (as here, the tree has ten levels below the root level) a hash function of a concatenation of the node value a(1,j) and the node values in $k_j$ (according to the nodes ordering in the binary tree and the tree concatenation ordering with the conventional concatenation scheme). Consequently, a biometric digital passport secured according to the invention provides both a forgery-proof link between the "personal data" and the "biometry data" of its holder, and a unique and forgery-proof link between the physical person of the holder and the holder's identity.

Figure 2B:
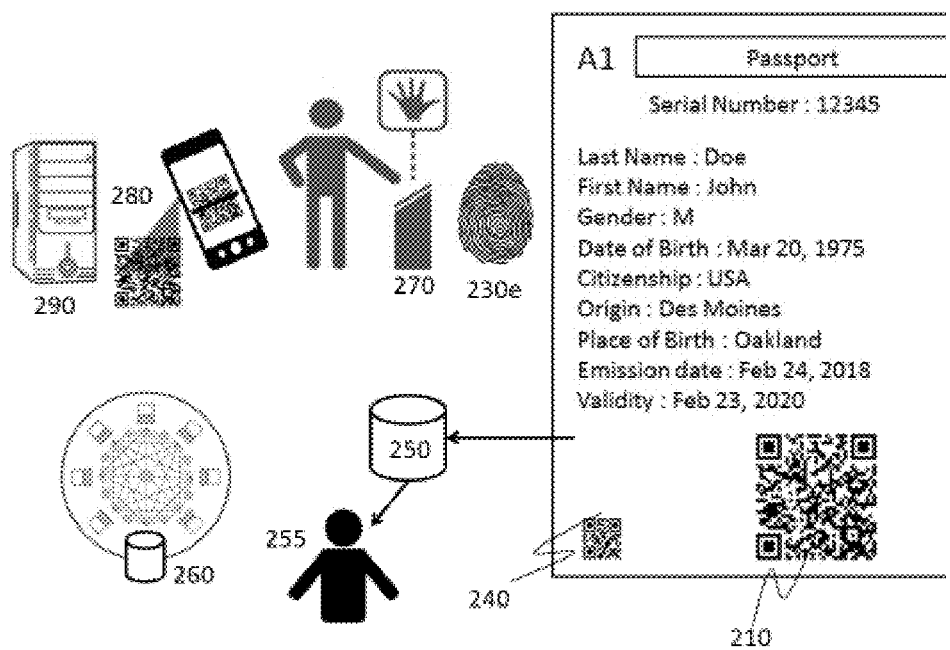
FIG. 2B illustrates a control of an individual having the secured digital biometric passport of FIG. 2A by an authorized officer.

FIG. 2B illustrates a control process of the secured biometric digital passport $A_1$ of FIG. 2A, with its passport data marking 230 corresponding to a certain John Doe, with its biometry data 230e corresponding to John Doe's fingerprint, and with digital data corresponding to a digital additional passport identity photograph 255 of John Doe that is accessible via the link to the information database 250 included in the information access marking 240. The passport data further comprises the unique serial number 235 assigned by the authority having delivered the passport. The digital security marking 210 of the passport $A_1$ contains the verification information $(D_1,k_1)$, with passport digital data $D_1$ corresponding to the printed passport data 230a-230d, the biometry data 230e and the unique serial number 235, and the digital verification key $k_1$ corresponding to the sequence of 10 node values {a(1,2), a(2,2), . . . , a(10,2)} which are necessary for retrieving the root value R from node value a(1,1) of digital passport $A_1$ (with $a(1,1)=x_1=H(D_1)$). The reference root digital signature R may be time-stamped and stored in a blockchain 260. In this example, the biometry data 230e of the respective holders of the biometric passports of the batch are also stored in the blockchain 260 in association with, respectively, their corresponding unique serial numbers (so as to make these data immutable). The stored biometry data of John Doe can be retrieved by sending a request to the blockchain 260 indicating the unique serial number 235 mentioned on his passport. The authorities in charge of controlling identity of people (for example, the police, the customs etc.) can access the blockchain 260 via a communication link, and, in this illustrative embodiment, have also local storage capabilities for storing the (published) root digital signatures of all the delivered batches of biometric digital passports. In the example shown on FIG. 2B, the information database 250 is local (i.e. directly accessible to the authorities, without having to use a public communication network). Moreover, these authorities are equipped with fingerprint scanners 270 to capture the fingerprints of individuals and calculate corresponding machine readable representations of data characterizing the captured fingerprints, i.e. biometry data 230e.

During an identity control of John Doe, say by a police or a customs officer, the officer receives the secured biometric digital passport $A_1$ of John Doe, reads and decodes the verification information $(D_1,k_1)$ stored in the digital security marking 210 of the digital passport by means of an appropriate reader, that may be for example a suitably programmed computer 290, the computer being connected to the local storage capabilities 250. Having read the passport digital data $D_1$ and the digital verification key $k_1$ and sent it to the computer 290, a dedicated application (with programmed hash function H and concatenation of node values) running on the computer 290 calculates the passport digital signature $x_1$ (as $x_1=H(D_1)$) and a candidate batch value $R^c$ as: H(H(H(H(H(H(H(H(H(a(1,1)+a(1,2))+a(2,2))+ . . . )+ . . . )+ . . . )+ . . . )+ . . . )+ . . . )+a(9,2))+a(10,2)), i.e. the composition of ten times a hash function of a concatenation of the node value a(1,1) and the node values in $k_1$={a(1,2), a(2,2), . . . , a(10,2)}. Then, the computer can, for example, search in the local information database 250 a reference root digital signature R matching the candidate value $R^c$: in case there is no matching, the passport is a forged one and "John Doe" (i.e. the screened individual claiming that his name is John Doe) may be arrested. In case $R^c$ matches some stored reference root digital signature, the passport is considered as genuine and the officer may perform additional security checks:

the officer retrieves the digital identity photograph 255 stored in the information database 250, by sending a request via the computer 290 containing the serial number 235 printed on $A_1$, receives it back and display the received identity photograph 255 on a screen of the computer 290: the officer can then visually compare the displayed visage (i.e. that of a certain John Doe) with that of the individual being checked and estimate if the two visages are similar or not; and the officer retrieves the biometry data 230e on the passport $A_1$ by reading these data on the digital security marking 210 with the computer 290, and scans the individual's fingerprint by means of a fingerprint scanner 270 connected to the computer 290 and obtains the corresponding individual's biometry data: the officer then checks by means of a program running on the computer 290 if the retrieved biometry data 230e is similar (within a given margin of error) to the obtained individual's biometry data.

If the two visages and the biometry data are judged similar, everything is all right and the checked individual is indeed the real John Doe, the owner of the genuine biometric passport $A_1$.

In case of any one of the above additional security checks fails, clearly, the individual in front of the officer is not the true holder of the genuine biometric passport $A_1$. Thus, with a secured biometric digital passport according to the invention a mere offline check can quickly detect any fraud.

In fact, it is even possible to reduce a digital biometric passport document to a mere digital file with just a digital representation of a 2D barcode (like the above example of a QR code) including the verification information V=(D,k): with V comprising the holder's biography data and (unique) biometry data, like the holder's fingerprint (within the passport digital data D) and the verification key. Indeed, according to the invention, even this "reduced" secured digital passport takes full advantage of the above mentioned forgery-proof link created between the "personal biography data" and the "biometry data" of the passport holder, and the unique and forgery-proof link between the physical person of the holder and the holder's identity.

Figure 3:
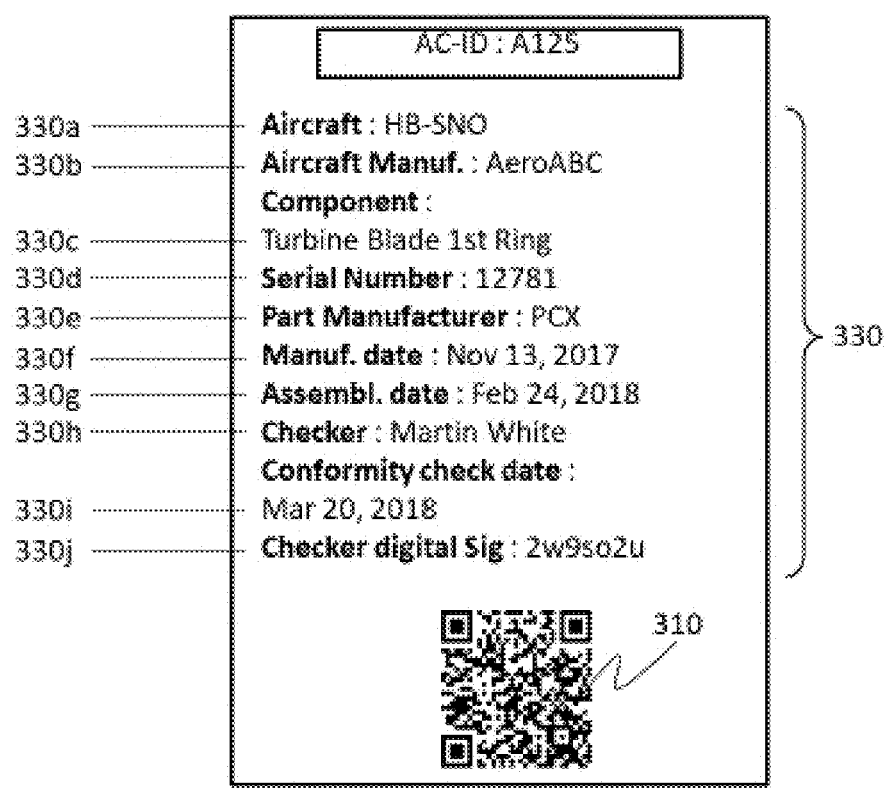
FIG. 3 illustrates a batch of digital documents relating to components of an aircraft secured according to the invention.

Another illustrative embodiment of the invention relates to components of an aircraft, as shown on FIG. 3. Due to the very high price of certain critical components from which failure could affect the security of the aircraft, like some parts of the reactors (e.g. turbine blades, pumps . . . ) or of the landing gear, or batteries etc. . . . , counterfeiters are interested to produce copies of these components but of course without complying with the required safety technical requirements due to their generally lower quality. Even if an aircraft component is generally marked with a corresponding unique serial number to identify it, that sort of marking may be easily counterfeited. These counterfeit airplane parts are generally defective and can cause severe damages or even plane crashes. This is a growing security problem today. Moreover, even if the components are genuine, they may not be convenient for certain versions of a same type of aircraft, and there is a serious risk that an inappropriate component is inadvertently used for repairing a given aircraft for example. It is thus important to secure at least the critical genuine components that are allowed for given aircraft.

Generally, each component has a corresponding (possibly digital) technical data sheet indicating e.g. the component technical name, the component unique serial number, the component manufacturer name, the manufacturing date of the component and certification information. Moreover, for a given aircraft, a corresponding record contains all the (digital) technical data sheets of its respective components. However, counterfeited components may have their corresponding fake digital technical data sheet and thus, it is not obvious (unless by performing technical tests, for example) to detect fraud. For example, how to be sure that a digital technical data sheet corresponds well to a component mounted on a specific aircraft (and vice versa)?

According to an illustrative embodiment of the invention, the allowed parts to be used for manufacturing or repairing a given aircraft, or that are mounted on the aircraft, are considered as belonging to a batch of "components" (or "objects") for that very aircraft.

In the specific illustrative embodiment shown on FIG. 3, each component of an aircraft batch, i.e. each allowed aircraft component for mount or repair on a given aircraft, has a corresponding aircraft component digital identification document AC-ID that contains the same component digital data as in a conventional technical data sheet (e.g. the aircraft ID code, the aircraft manufacturer name, the component technical name, the component unique serial number, the component manufacturer name, and the manufacturing date of the component) together with additional digital data corresponding, to the aircraft ID code, the aircraft manufacturer name, the assembly date of the component on the aircraft, the name of the technician in charge of performing the conformity check together with the date of the conformity check, and the corresponding (unique) digital signature of the checker. Moreover, each aircraft component digital identification document AC-ID is secured by means of a machine readable digital security marking added to it. For clarity reason, the digital data of AC-ID:$A_{125}$ is represented on FIG. 3 as equivalent textual and alphanumerical information (i.e. human readable), and the digital security marking 310 is shown as equivalent conventional QR code two-dimensional pattern.

Preferably, each time a component or a set of components are replaced on the aircraft, corresponding secured digital AC-ID documents are created and a corresponding updated version of the aircraft batch is also created, with the above mentioned corresponding additional digital data (relating to the new mounting operations).

Thus, all the (critical) mounted components on a specific aircraft (here, having the aircraft ID reference HB-SNO), belong to a corresponding batch of mounted components (here, having a total of $\mu$ components) and are documented in a corresponding batch of associated $\mu$ digital files, i.e. the digital identification document AC-ID. A digital security marking 310 (here in the form of a QR code) is included in each aircraft component digital identification document, for example AC-ID:$A_{125}$, that is associated with the corresponding aircraft component, here $A_{125}$, mounted on the aircraft HB-SNO. FIG. 3 particularly shows the component $A_{125}$ of the aircraft batch being a turbine blade adapted to the reactor type mounted on the aircraft HB-SNO and marked with a unique manufacturing serial number (here, 12781, generally engraved by the manufacturer). The component digital data $D_{125}$ in the digital security marking 310 of the aircraft component digital identification document AC-ID:$A_{125}$ associated with component $A_{125}$ comprises the digital data corresponding to that of the technical data sheet: the aircraft ID code 330a (here, HB-SNO), the aircraft manufacturer name 330b (here, AeroABC), the component technical name 330c (here, turbine blade—$1^{st}$ ring), the component serial number 330d (here, 12781), the component manufacturer name 330e (here, PCX), the manufacturing date of the component 330f (here, Nov. 13, 2017), the assembly date of the component on the reactor 330g (here, Feb. 24, 2018), the name of the technician in charge of performing the conformity check 330h (here, the checker is Martin White) together with the date of the conformity check 330i (here, Mar. 20, 2018), and the (unique) digital signature of the checker 330j (here, 2w9s02u).

A component digital signature $x_{125}$ of the component digital data $D_{125}$ of the digital file AC-ID:$A_{125}$ of component $A_{125}$ is calculated by means of a one-way hash function H as $x_{125}=H(D_{125})$. In the same way, all the component digital signatures $x_i$ of the component digital data $D_i$ of component $A_i$ are calculated by means of the one-way hash function H as $x_i=H(D_i)$ (here, i=1, . . . , $\mu$). According to the invention, a tree associated with the batch of components $A_1, \ldots, A_\mu$ (here, a binary tree), and thus with the corresponding batch of digital files AC-ID:$A_1, \ldots,$ AC-ID:$A_\mu$, is built having $\mu$ leaf nodes a(1, 1), . . . , a(1,$\mu$) respectively corresponding to the $\mu$ component digital signatures $x_1, \ldots, x_\mu$ of respective component digital data $D_i, \ldots, D_\mu$ of the component digital identification documents AC-ID:$A_1, \ldots,$ AC-ID:$A_\mu$ of components $A_1, \ldots, A_\mu$. Here, the nodes ordering of the binary tree is the conventional one, i.e. the nodes a(i,j) are arranged according to the values of the indexes (i,j): index i indicates the level in the tree, starting from the leaf nodes level (i=1) to the penultimate nodes level below the root node, and index j running from 1 to $\mu$ for the leaf nodes level (level 1), from 1 to $\mu$/2 for the next (non-leaf) nodes level (level 2), etc. and from 1 to 2 for the penultimate nodes level. The tree comprising node levels from the leaf nodes to the root node, every non-leaf node of the tree corresponding to a digital signature by means of the one-way function H of a concatenation of the respective digital signatures of its child nodes according to the tree concatenation ordering.

A reference root digital signature R for the batch of μ aircraft components $A_1, \ldots A_\mu$ is calculated by means of a one-way function of a (conventional) concatenation of node values of the tree (as explained below). The reference root digital signature R is then stored in a searchable database (preferably a blockchain) accessible to technicians in charge of controlling or changing the mounted components. The tree thus comprises node levels from the leaf nodes to the root node of the tree, every non-leaf node of the tree corresponding to a digital signature by means of the one-way function H of a concatenation of the respective digital signatures of its (two) child nodes according to the tree concatenation ordering (here conventional), the root node corresponding to the reference root digital signature R, i.e. the digital signature by means of the one-way function H of a concatenation of the digital signatures of the nodes of the penultimate nodes level in the tree (according to the nodes ordering in the tree and the tree concatenation ordering).

For a given component $A_i$ of the batch, a digital verification key $k_i$, corresponding to the component digital signature $x_i$ (i.e. leaf node a(1,i)) of the component digital data $D_i$, is calculated as the sequence of the respective digital signatures, from the leaf nodes level to the penultimate nodes level of the tree, of every other leaf node having the same parent node in the tree that the leaf-node a(1,i) corresponding to the digital signature $x_i$, and successively at each next level in the tree, of every non-leaf node having the same parent node in the tree that the previous same parent node considered at the preceding level. For each component $A_i$ mounted on the aircraft HB-SNO, the associated component digital data $D_i$ and the corresponding digital verification key $k_i$ are embedded in the digital security marking 310 included in the corresponding aircraft component digital identification document AC-ID:$A_i$.

For example, in case of a control operation of a component on the aircraft HB-SNO, a technician may send a request to the searchable database containing the component serial number 12781 read on the digital file AC-ID:$A_{125}$ of component $A_{125}$ to be controlled, or its digital verification key $k_{125}$ as read on the digital security marking 310 on the corresponding AC-ID:$A_{125}$ document with an appropriate reader, as for example a computer programmed for decoding the content of the digital security marking, and will receive back the corresponding batch value R. In a preferred variant allowing complete offline checking, the technician's computer has a memory storing all the root digital signatures relating to the aircrafts to be controlled. In this latter variant, the technician can then check if the component is genuine by reading the component digital data $D_{125}$ on the digital security marking 310 of AC-ID:$A_{125}$, checking that the unique serial number 330d (here, 12781) extracted from $D_{125}$ matches the serial number physically marked on the mounted aircraft component $A_{125}$, calculating the corresponding component digital signature $x_{125}$ (for example, by running a programmed application on a processing unit CPU of the computer which calculates the signature $x_{125}$=H$(D_{125})$, from the read digital data $D_{125}$), calculating a candidate batch value $R^c$ via the one-way function H programmed on the computer's CPU as the hash of a concatenation of the leaf node value $a(1,125)=x_{125}$ and the node values given in the corresponding digital verification key $k_{125}$, and checking that the candidate batch value $R^c$ matches one of the reference root digital signatures stored in the computer's memory (i.e. the reference value R, corresponding to the aircraft HB-SNO). In case of full matching (i.e. the serial numbers match and $R^c$=R), the component $A_{125}$ is considered as genuine and belongs to the (up-to-date) aircraft batch of allowed components of the HB-SNO aircraft, if $R^c$ does not match a stored reference root digital signature R, or if the serial numbers do not match, the component $A_{125}$ is possibly counterfeit, or is a genuine component not allowed for the aircraft HB-SNO (e.g. $A_{125}$ does not belong to the right batch for this aircraft), and must be changed.

In a same way, the invention would allow detecting fraud (or errors) from batches of secured AC-IDs of replacement parts stored in a warehouse by verifying the authenticity of the markings on the stored parts and checking that the component serial number from the digital security marking matches that marked on the corresponding component. In case of a highly critical component, a tamperproof material-based security marking may further be applied on the component, while the digital data relating to the corresponding reference unique physical characteristic, i.e. the characteristic digital data CDD (for example, as captured by a suitable sensor when applying the material-based security marking) of this marking is preferably made part of the component digital data D in the digital security marking of the aircraft component digital identification document for this component, and a corresponding reference unique physical signature data UPS is calculated (for example, by taking a hash of the characteristic digital data CDD, i.e. UPS=H(CDD)) and may also be part of the component digital data D. This additional level of security improves the security provided by the unique serial number marked on the component by its manufacturer. Preferably, the reference UPC and UPS are stored in the blockchain (to make them immutable) and are accessible to the technician. Moreover, these reference values may also be further stored in the memory of the technician's computer in order to allow offline authentication of the material-based security marking on the highly critical component.

The further offline operation of authentication of this material-based security marking may comprise measuring the unique physical characteristic on the component, by means of a suitable sensor connected to the computer, and obtaining a candidate characteristic digital data $CDD^c$ from the measured characteristic (for example, via a specific application programmed in the CPU of the computer). Then, the technician (or the CPU of his computer, if suitably programmed) compares the obtained $CDD^c$ with the copy of the reference CDD stored in the memory of the computer: in case of "reasonable" matching $CDD^c \approx CDD$ (i.e. within some predefined error tolerance criterion), the material-based security marking, and thus the component, are considered as genuine.

As above mentioned, a copy of the reference characteristic digital data CDD, instead of being stored in the memory of the technician's computer, is part of the digital data D included in the digital security marking in the aircraft component digital identification document AC-ID:A of the component A and can be obtained by direct reading of the digital security marking. The technician may then read the candidate $CDD^c$ on the digital security marking and check that the signature UPS stored in the memory of the computer matches the candidate signature $UPS^c$ calculated from the read candidate $CDD^c$ by computing $UPS^c$=H$(CDD^c)$: in case of matching $UPS^c$=UPS, the material-based security marking, and thus the component, are confirmed as being genuine.

In a variant of the embodiment, the checking of authenticity of a component by a technician may alternatively be performed via online process in a similar way as already explained with the first detailed embodiment of the invention, and will not be repeated here.

According to the invention, it is further possible to verify the authenticity of a copy of an aircraft component digital identification document, AC-ID:$A_{125}$ for example, with respect to the original secured digital file. Indeed, if a technician in charge of control (or repair) operations has access to the digital file AC-ID:$A_{125}$ on its computer (which may be, for example, a smartphone suitably programmed), he can check that the component digital data correspond to that of the original document by performing the following operations of:

- reading the component digital data $D_{125}$ and the digital verification key $k_{125}$ on the digital security marking 310 of the component digital identification document AC-ID:$A_{125}$;
- acquiring a reference batch value R of the batch corresponding to the document AC-ID:$A_{125}$; this reference value may be already in the memory of the computer or may be acquired via a communication link from a database storing the reference batch values of aircraft component digital identification documents in case the computer is equipped with a communication unit, by sending a request containing, for example, the component (unique) serial number or merely the key $k_{125}$ read of the digital security marking 310, and receiving back the corresponding reference batch value R;
- calculating (with the programmed one-way function H) a component digital signature $x_{125}$ from the read component digital data $D_{125}$, with $x_{125}=H(D_{125})$;
- calculating a candidate batch value $R^c$ (by means of the programmed one-way hash function H and digital signature of a concatenation of digital signatures) as the digital signature by the hash function H of a concatenation of the leaf node value $x_{125}$ and the node values indicated in the digital verification key $k_{125}$ (according to the nodes ordering in the tree and the tree concatenation ordering); and
- verifying that the candidate batch value $R^c$ matches the reference batch value R.

According to the above detailed description, the invention is clearly compatible with offline and local checking operations for verifying the authenticity of a secured digital file, or conformity of data of a copy of a secured digital file, with respect to the data associated with the original secured digital file. However, the invention is also compatible with online verification process, for example by receiving (via a communication link) a reference batch value (or root digital signature) form an external source (e.g. server or blockchain), or performing some or all the calculation steps involving the one-way function or the concatenation of digital signatures via external computing means (e.g. operating on a server), or even performing the verification that a candidate root digital signature matches a reference root digital signature (and just receiving the result).

The above disclosed subject matter is to be considered illustrative, and not restrictive, and serves to provide a better understanding of the invention defined by the independent claims.

The invention claimed is:

1. A method of securing a given original digital file belonging to a batch of a plurality of original digital files against forgery or tampering, each original digital file including its own digital data, comprising the steps of:

- for each original digital file of the batch, calculating by means of a one-way function an associated digital file signature of its digital data;
- forming a tree based on the plurality of calculated digital file signatures for the original digital files of the batch and comprising nodes arranged according to a given nodes ordering in the tree, the tree comprising node levels from the leaf nodes, corresponding to the plurality of digital file signatures respectively associated to the plurality of original digital files in the batch, to the root node of the tree, every non-leaf node of the tree corresponding to a digital signature by means of the one-way function of a concatenation of the respective digital signatures of its child nodes according to a tree concatenation ordering, the root node corresponding to a reference root digital signature, wherein the root digital signature is generated by means of the one-way function of a concatenation of the digital signatures of the nodes of a penultimate nodes level in the tree according to the tree concatenation ordering;
- associating with the given original digital file a corresponding digital verification key being a sequence of the respective digital signatures, from the leaf nodes level to the penultimate nodes level, of every other leaf node having the same parent node in the tree that the leaf-node corresponding to the digital file signature of the given original digital file, and successively at each next level in the tree, of every non-leaf node having the same parent node in the tree that the previous same parent node considered at the preceding level;
- making available to a user the reference root digital signature of the tree; and
- including in the given original digital file a corresponding machine readable digital security marking including a two-dimensional barcode comprising a representation of its digital data and its corresponding digital verification key,
- thereby obtaining a marked original digital file of which digital data are secured against forgery or tampering,
- wherein the digital data of the marked original digital file include reference characteristic digital data of a corresponding unique physical characteristic of an associated object or individual; and
- delivering an indication that the digital file is genuine or fake in response to a digital signature verification of the digital file, and enabling a computer system to perform a predetermined action.

2. The method according to claim 1, wherein the reference root digital signature of the root node of the tree is either published in a media accessible to the user, or stored in a searchable root database accessible to the user, or stored in a blockchain, or in a database secured by a blockchain, accessible to the user.

3. The method according to claim 2, wherein the marked original digital file further comprises root node access data included thereto and containing information sufficient to allow the user to access to the reference root digital signature of the root node of the tree corresponding to the batch of original digital files, the information being a link to an access interface configured to receive from the user a root request containing digital data, or digital file signature, obtained from a digital security marking of a marked original digital file, and send back a reference root digital signature of corresponding tree, the access interface allowing access to, respectively, one of the following: the media wherein the reference root digital signature is published; the searchable root database wherein the reference root digital signature is stored; and the blockchain, or respectively the database secured by a blockchain, wherein the time-stamped reference root digital signature is stored.

4. The method according to claim 1, wherein a virtual digital file is counted as belonging to the batch of original digital files, the virtual digital file including its own virtual digital data, and an associated virtual digital file signature obtained by means of the one-way function of the virtual digital data, the virtual digital file being not real but only used for generating the associated virtual digital file signature from its virtual digital data; and the reference root digital signature associated with the batch of original digital files being calculated from a tree having all the digital files signatures of the original digital files of the batch, including the virtual digital file signature, as leaf nodes.

5. The method according to claim 1, wherein additional digital data corresponding to the digital data associated with the marked original digital file are stored in a searchable information database accessible to the user via an information database interface configured to receive from the user an information request containing digital data, or a digital file signature, obtained from a digital security marking of a marked original digital file, and send back corresponding additional digital data.

6. The method according to claim 1, wherein the unique physical characteristic of the associated object or individual is, respectively, that of a material-based security marking applied on the associated object or identifying biometric feature of the associated individual.

7. The method according to claim 1, wherein the digital data of each of the respective original digital files of the batch have a same structure including several fields, wherein labels of these fields do not pertain to the digital data but are provided in a separate fields data block associated with the batch, and wherein:
  i) the digital file signature of an original digital file is calculated with the one-way function of a concatenation of the corresponding digital data and the fields data block; and
  ii) the reference root digital signature is made available to the user together with the associated fields data block.

8. A method of securing a given original digital file belonging to a batch of a plurality of original digital files against forgery or tampering, and verifying authenticity thereof, each original digital file including its own digital data, comprising the steps of:
  for each original digital file of the batch, calculating by means of a one-way function an associated digital file signature of its digital data;
  forming a tree based on the plurality of calculated digital file signatures for the original digital files of the batch and comprising nodes arranged according to a given nodes ordering in the tree, the tree comprising node levels from the leaf nodes, corresponding to the plurality of digital file signatures respectively associated to the plurality of original digital files in the batch, to the root node of the tree, every non-leaf node of the tree corresponding to a digital signature by means of the one-way function of a concatenation of the respective digital signatures of its child nodes according to a tree concatenation ordering, the root node corresponding to a reference root digital signature, wherein the root digital signature is generated by means of the one-way function of a concatenation of the digital signatures of the nodes of a penultimate nodes level in the tree according to the tree concatenation ordering;
  associating with the given original digital file a corresponding digital verification key being a sequence of the respective digital signatures, from the leaf nodes level to the penultimate nodes level, of every other leaf node having the same parent node in the tree that the leaf-node corresponding to the digital file signature of the given original digital file, and successively at each next level in the tree, of every non-leaf node having the same parent node in the tree that the previous same parent node considered at the preceding level;
  making available to a user the reference root digital signature of the tree; and
  including in the given original digital file a corresponding machine readable digital security marking including a two-dimensional barcode comprising a representation of its digital data and its corresponding digital verification key,
  thereby obtaining a marked original digital file of which digital data are secured against forgery or tampering,
  wherein the digital data of the marked original digital file include reference characteristic digital data of a corresponding unique physical characteristic of an associated object or individual; and
  delivering an indication that the digital file is genuine or fake in response to a digital signature verification of the digital file, and enabling a computer system to perform a predetermined action;
  processing a test file and storing the test file in memory;
  reading a representation of digital data and of a digital verification key on a digital security marking of the stored test file, and extracting respectively corresponding test digital data and test digital verification key from the read representation;
  having stored in the memory a reference root digital signature of a root node of a tree of the batch of original digital files, and having programmed in the processing unit the one-way function to calculate a digital signature of digital data and of a concatenation of digital signatures according to the nodes ordering in the tree and the tree concatenation ordering;
  verifying whether the extracted test digital data and associated test digital verification key indeed correspond to the stored reference root digital signature by performing the steps of:
    calculating with the one-way function a test digital signature of the extracted test digital data, the test digital signature corresponding to a test leaf node in a test tree corresponding to the digital security marking of the test file;
    extracting from the sequence of digital signatures in the test digital verification key, a digital signature of every other leaf node of the test tree having the same parent node than that of the test leaf node and calculating a digital signature of a concatenation of the test digital signature and the extracted digital signature of the every other leaf node, and obtaining a digital signature of the same parent node of the test leaf node;
    successively at each next level in the test tree and up to the penultimate nodes level, extracting from the sequence of digital signatures in the test digital verification key, a digital signature of every other non-leaf node of the test tree having the same parent node than that of the previous same parent node considered at the preceding step and calculating a digital signature of a concatenation of the digital signature of the respective every other non-leaf node and the obtained digital signature of the previous same parent node, and obtaining a digital signature of the same parent node of the previous same parent node;

calculating a digital signature of a concatenation of the obtained digital signatures of the non-leaf nodes corresponding to the penultimate nodes level of the test tree, and obtaining a candidate root digital signature of the root node of the test tree; and checking whether the obtained candidate root digital signature matches the stored reference root digital signature, whereby, in case the root digital signatures match, the digital data of the test file are that of a genuine digital file.

9. The method according to claim 8, wherein the digital data of each of the respective original digital files of the batch have a same structure including several fields, wherein labels of these fields do not pertain to the digital data but are provided in a separate fields data block associated with the batch, and wherein:

i) the digital file signature of an original digital file is calculated with the one-way function of a concatenation of the corresponding digital data and the fields data block; and ii) the reference root digital signature is made available to the user together with the associated fields data block, the memory of the processing unit further storing the associated fields data block, and wherein:

the step of calculating a test digital signature corresponding to a test leaf node in a test tree corresponding to the digital security marking on the test file comprises calculating with the one-way function a digital signature of a concatenation of the extracted test digital data and the stored fields data block.

10. The method according to claim 8, wherein the digital file is secured by storing the reference root digital signature in a searchable root database accessible to the user, wherein the reference root digital signature of the root node of the tree is either published in a media accessible to the user, or stored in a searchable root database accessible to the user, or stored in a blockchain, or in a database secured by a blockchain, accessible to the user, and the processing unit is further connected to a communication unit configured to send and receive back data via a communication link, comprising the preliminary steps of:

sending with the communication unit via the communication link a request to the root database, and receiving back the reference root digital signature; and storing the received root digital signature in the memory of the memory.

11. The method according to claim 8, wherein the reference root digital signature of the root node of the tree is either published in a media accessible to the user, or stored in a searchable root database accessible to the user, or stored in a blockchain, or in a database secured by a blockchain, accessible to the user, and wherein the marked original digital file further comprises root node access data included thereto and containing information sufficient to allow the user to access to the reference root digital signature of the root node of the tree corresponding to the batch of original digital files, the information being a link to an access interface configured to receive from the user a root request containing digital data, or digital file signature, obtained from a digital security marking of a marked original digital file, and send back a reference root digital signature of corresponding tree, the access interface allowing access to, respectively, one of the following:

the media wherein the reference root digital signature is published;

the searchable root database wherein the reference root digital signature is stored; and the blockchain, or respectively the database secured by a blockchain, wherein the time-stamped reference root digital signature is stored, the processing unit is further connected to a communication unit configured to send and receive data via a communication link, comprising the preliminary steps of:

reading the root node access data included in the test file;

sending with the communication unit via the communication link a root request to the access interface containing digital data, or a digital signature of the digital data, obtained from the digital security marking on the test file, and receiving back a corresponding reference root digital signature of associated batch; and storing the received reference root digital signature in the memory.

12. The method according to claim 8, wherein additional digital data corresponding to the digital data associated with the marked original digital file are stored in a searchable information database accessible to the user via an information database interface configured to receive from the user an information request containing digital data, or a digital file signature, obtained from a digital security marking of a marked original digital file, and send back corresponding additional digital data and the imager is further equipped with communication means configured to send to the information database interface an information request containing digital data, or a digital file signature, obtained from the digital security marking of the test file, and receive back corresponding additional digital data.

13. The method according to claim 8, wherein the digital data of the marked original digital file include reference characteristic digital data of a corresponding unique physical characteristic of an associated object or individual, and the imager is further equipped with a sensor configured to detect a unique physical characteristic of respectively an associated object or individual, and the processing unit is programmed to extract corresponding characteristic digital data from a detection signal received from the sensor, the imager having stored in the memory reference characteristic digital data (CDD) corresponding to the unique physical characteristic of respectively the associated object or individual, comprising the further steps of, upon viewing a subject being the associated object or individual:

detecting with the sensor a unique physical characteristic of the subject and extracting corresponding candidate characteristic digital data ($CDD^c$);

comparing the obtained candidate characteristic digital data ($CDD^c$) with the stored reference characteristic digital data (CDD); and in case the candidate characteristic digital data (CDD) is similar to the stored reference characteristic digital data (CDD), within a given tolerance criterion, the subject is considered as corresponding respectively to a genuine object or individual validly associated with a genuine digital file.

14. A system for verifying the authenticity of a digital file, or the conformity of a copy of such digital file, with respect to a marked original digital file belonging to a batch of secured original digital files, comprising an imager having an imaging unit, a processing unit with a memory, and an image processing unit, the memory storing a reference root digital signature of a tree corresponding to the batch of original digital files, and a one-way function to calculate a digital signature of digital data and of a concatenation of digital signatures according to the nodes ordering of the tree and the tree concatenation ordering being programmed in the processing unit, wherein the digital data of the marked original digital file include reference characteristic digital data of a corresponding unique physical characteristic of an associated object or individual, the system being configured to:

have stored in the memory a test file being the digital file or said copy of the digital file;

read a representation of digital data and of a digital verification key on a digital security marking of the stored test file including a two-dimensional barcode, and extract respectively corresponding test digital data and test digital verification key from the read representation;

verify whether the extracted test digital data and test digital verification key indeed correspond to the stored reference root digital signature by performing on the processing unit the programmed operations of:

calculating with the one-way function a test digital signature of the extracted test digital data, the test digital signature corresponding to a test leaf node in a test tree corresponding to the digital security marking of the test file;

extracting from the sequence of digital signatures in the test digital verification key, a digital signature of every other leaf node of the test tree having the same parent node than that of the test leaf node and calculating a digital signature of a concatenation of the test digital signature and the extracted digital signature of the every other leaf node, and obtaining a digital signature of the same parent node of the test leaf node;

successively at each next level in the test tree and up to the penultimate nodes level, extracting from the sequence of digital signatures in the test digital verification key, a digital signature of every other non-leaf node of the test tree having the same parent node than that of the previous same parent node considered at the preceding step and calculating a digital signature of a concatenation of the digital signature of the respective every other non-leaf node and the obtained digital signature of the previous same parent node, and obtaining a digital signature of the same parent node of the previous same parent node;

calculating a digital signature of a concatenation of the obtained digital signatures of the non-leaf nodes corresponding to the penultimate nodes level of the test tree and obtaining a candidate root digital signature of the root node of the test tree; and checking whether the obtained candidate root digital signature matches the stored reference root digital signature, whereby, in case the root digital signatures match, the system is configured to deliver an indication that the digital data of the test file are that of a genuine digital file; and deliver an indication that the digital file is genuine or fake in response to a digital signature verification of the digital file, and enable a computer system to perform a predetermined action.

15. The system according to claim 14, wherein the digital data of each of the respective original digital files of the batch have a same structure including several fields, wherein labels of these fields do not pertain to the digital data but are provided in a separate fields data block associated with the batch, and wherein:

i) the digital file signature of an original digital file is calculated with the one-way function of a concatenation of the corresponding digital data and the fields data block; and ii) the reference root digital signature is made available to the user together with the associated fields data block, the memory of the processing unit further storing the associated fields data block, and wherein:

the programmed operations of calculating a test digital signature corresponding to a test leaf node in a test tree corresponding to the digital security marking of the test file comprise calculating with the one-way function a digital signature of a concatenation of the extracted test digital data and the stored fields data block.

16. The system according to claim 14, system being further equipped with a sensor connected to the processing unit and configured to detect a unique physical characteristic of an associated object or individual, and the processing unit being programmed to extract corresponding characteristic digital data from a detection signal received from the sensor, the system having stored in the memory reference characteristic digital data (CDD) corresponding to the unique physical characteristic of the associated object or individual, the system being further configured to:

detect with the sensor a unique physical characteristic of a subject being the associated object or individual, and extract corresponding candidate characteristic digital data ($CDD^c$);

compare the obtained candidate characteristic digital data ($CDD^c$) with the stored reference characteristic digital data (CDD); and in case the candidate characteristic digital data ($CDD^c$) is similar to the stored reference characteristic digital data (CDD), within a given tolerance criterion, deliver an indication that the subject is considered as genuine.

* * * * *